(12) United States Patent
Kanari

(10) Patent No.: US 10,845,636 B2
(45) Date of Patent: Nov. 24, 2020

(54) INPUT DETECTION DEVICE

(71) Applicant: Japan Display Inc., Tokyo (JP)

(72) Inventor: Yuzo Kanari, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/690,889

(22) Filed: Nov. 21, 2019

(65) Prior Publication Data

US 2020/0089039 A1 Mar. 19, 2020

Related U.S. Application Data

(63) Continuation of application No. 15/608,236, filed on May 30, 2017, now Pat. No. 10,488,691.

(30) Foreign Application Priority Data

Jun. 7, 2016 (JP) .................. 2016-113648

(51) Int. Cl.
*G02F 1/1333* (2006.01)
*G06F 3/041* (2006.01)
*G06F 3/044* (2006.01)
*G09G 3/36* (2006.01)

(52) U.S. Cl.
CPC .......... *G02F 1/13338* (2013.01); *G06F 3/044* (2013.01); *G06F 3/0412* (2013.01); *G06F 3/0416* (2013.01); *G09G 3/3655* (2013.01); *G09G 3/3674* (2013.01); *G06F 2203/04112* (2013.01)

(58) Field of Classification Search
CPC .. G02F 1/13338; G06F 3/0412; G06F 3/0416; G06F 3/044; G06F 2203/04112; G09G 3/3655; G09G 3/3674
See application file for complete search history.

(56) References Cited

U.S. PATENT DOCUMENTS

| | | |
|---|---|---|
| 2005/0244609 A1 | 11/2005 | Arakawa et al. |
| 2012/0261242 A1 | 10/2012 | Guard et al. |
| 2013/0234974 A1 | 9/2013 | Guard |
| 2014/0293158 A1 | 10/2014 | Kurasawa et al. |
| 2016/0018928 A1 | 1/2016 | Kurasawa et al. |

FOREIGN PATENT DOCUMENTS

JP 2014-191660 A 10/2014

OTHER PUBLICATIONS

Japanese Office Action dated Feb. 4, 2020 in corresponding Japanese Application No. 2016-113648.

*Primary Examiner* — Wing H Chow
(74) *Attorney, Agent, or Firm* — K&L Gates LLP

(57) ABSTRACT

An input detection device includes a substrate; detection electrodes disposed on a plane parallel to the substrate, each detection electrode including first and second conductive wires, and opening portions; a display region; and a dummy electrode provided on a plane parallel to the substrate, the dummy electrode including first dummy wires along the first direction, wherein the display region includes pixels in a matrix, wherein each of the pixels includes subpixels, wherein each of the first conductive wires includes a first wide portion, and a first narrow portion, wherein each of the second conductive wires includes a second wide portion, and a second narrow portion, and wherein each of the first dummy wire includes a first dummy wide portion.

6 Claims, 22 Drawing Sheets

FIG.12
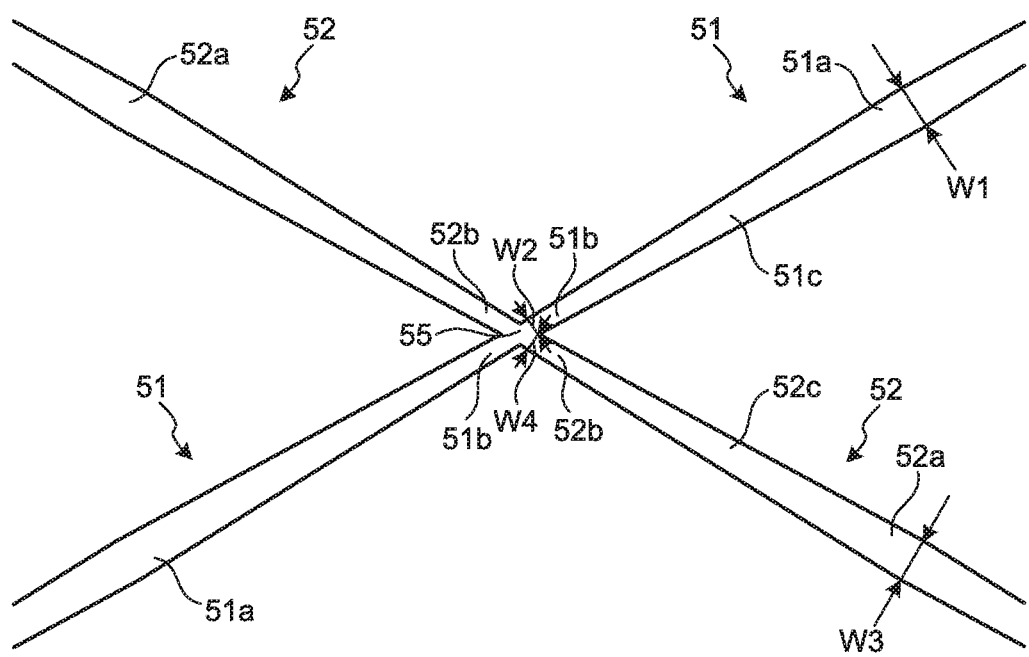
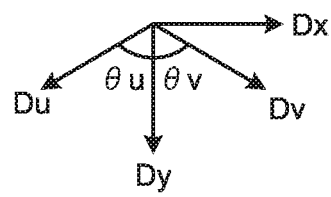

FIG.14
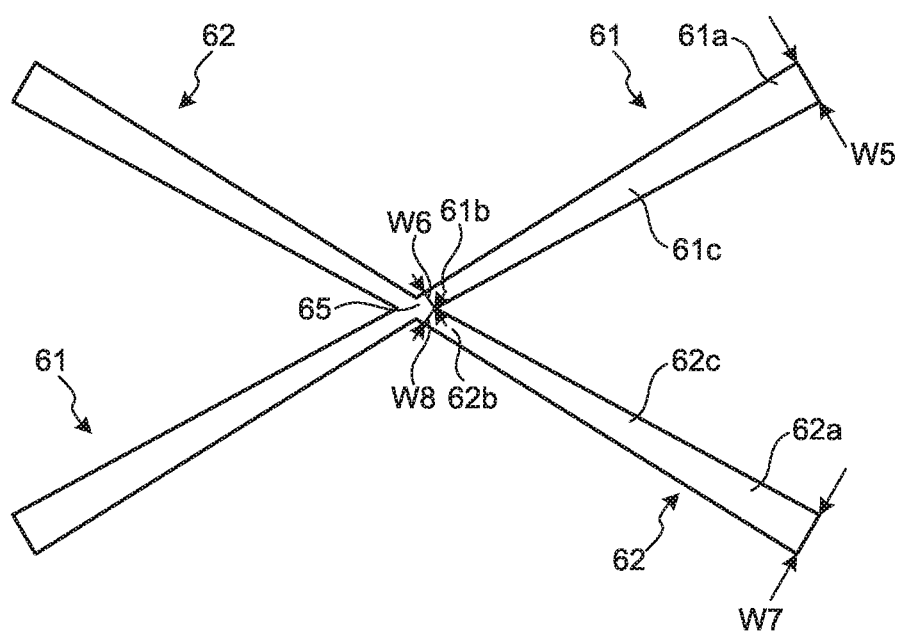
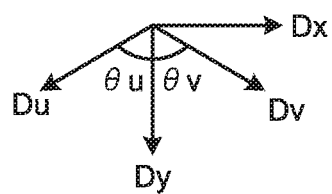

FIG.15
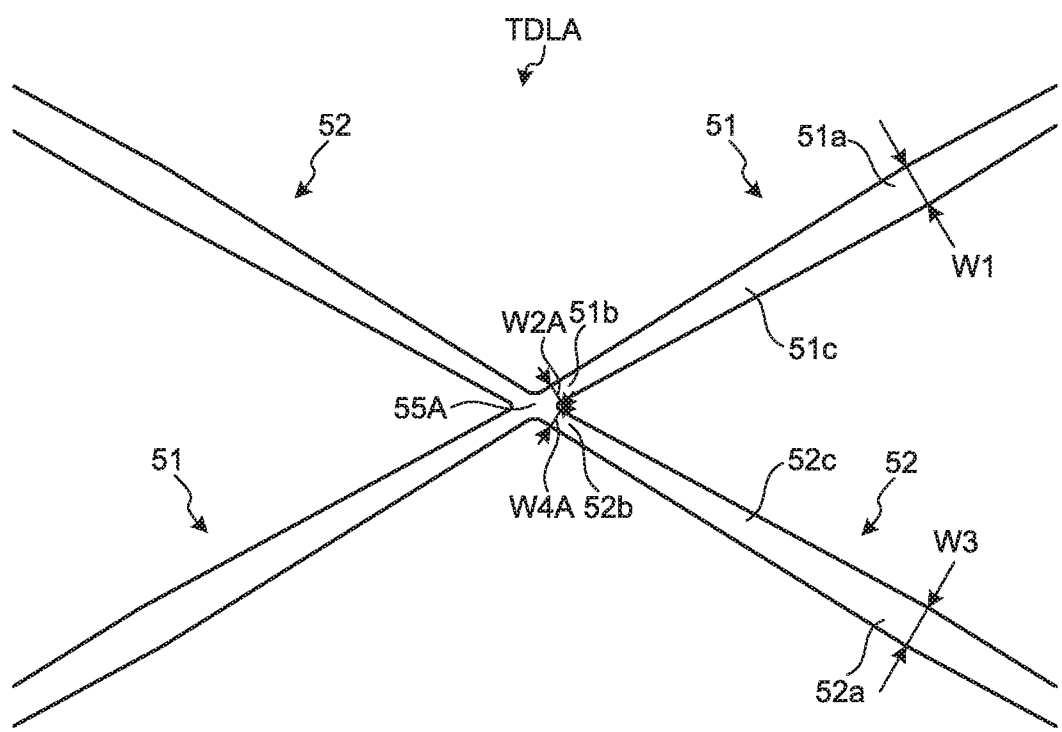
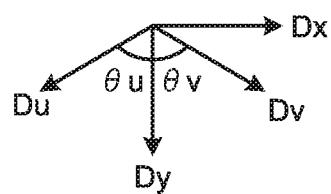

FIG.16
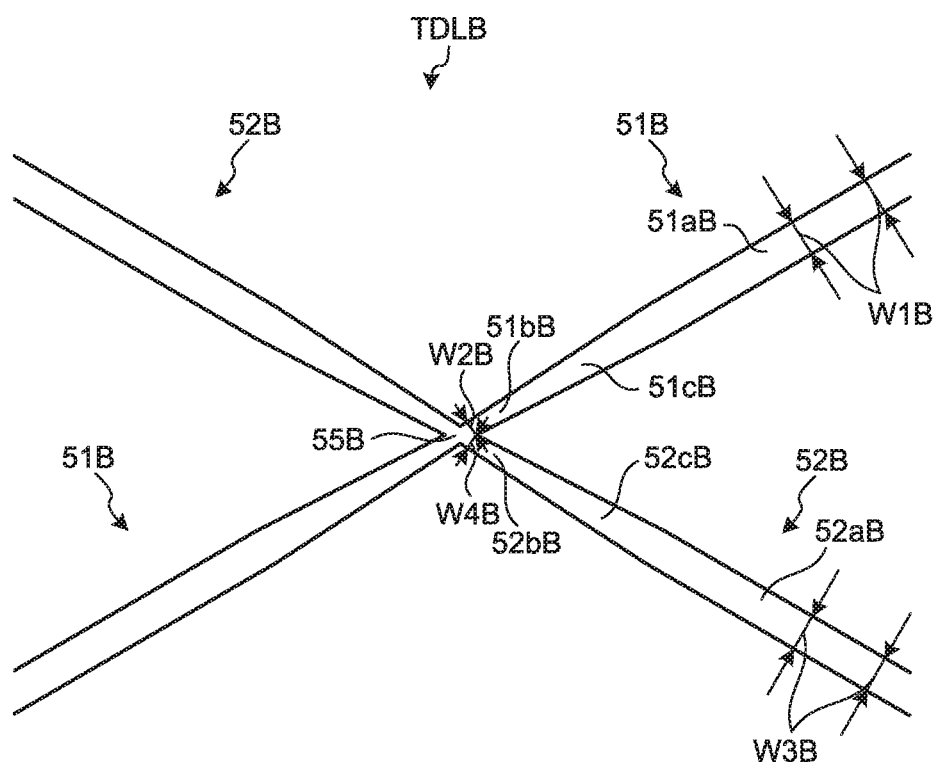
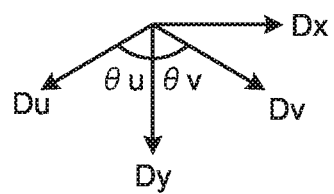

FIG.18
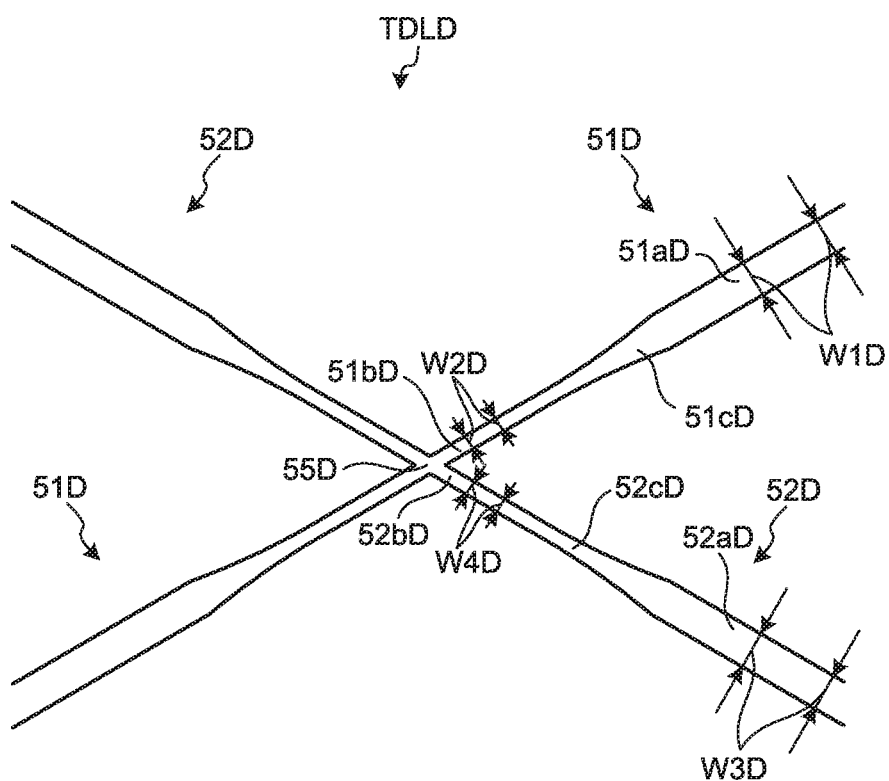
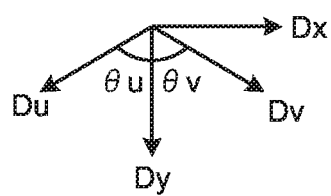

FIG.19
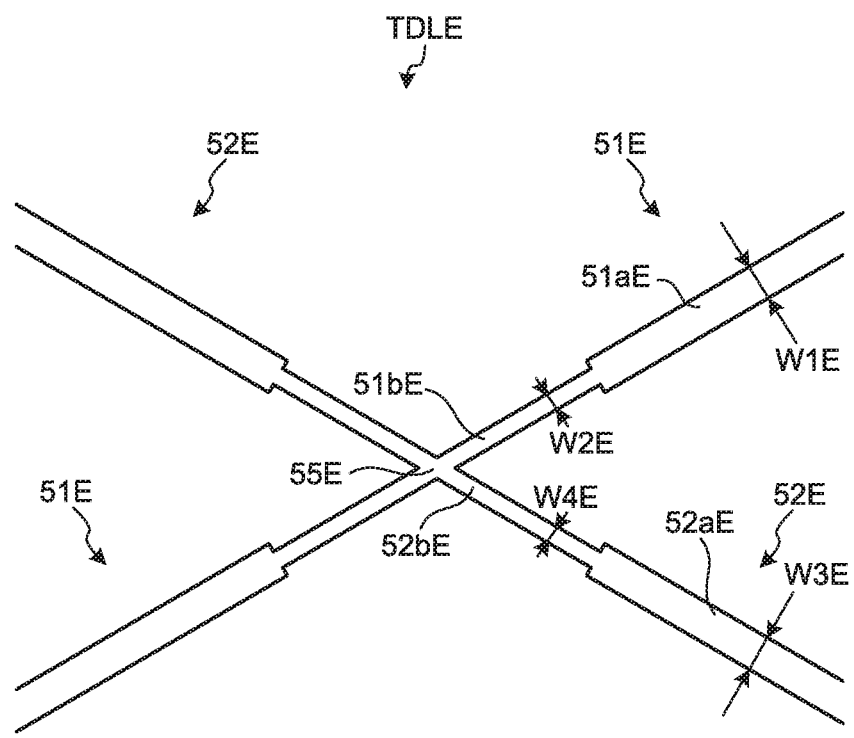
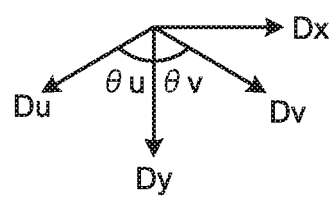

FIG.21
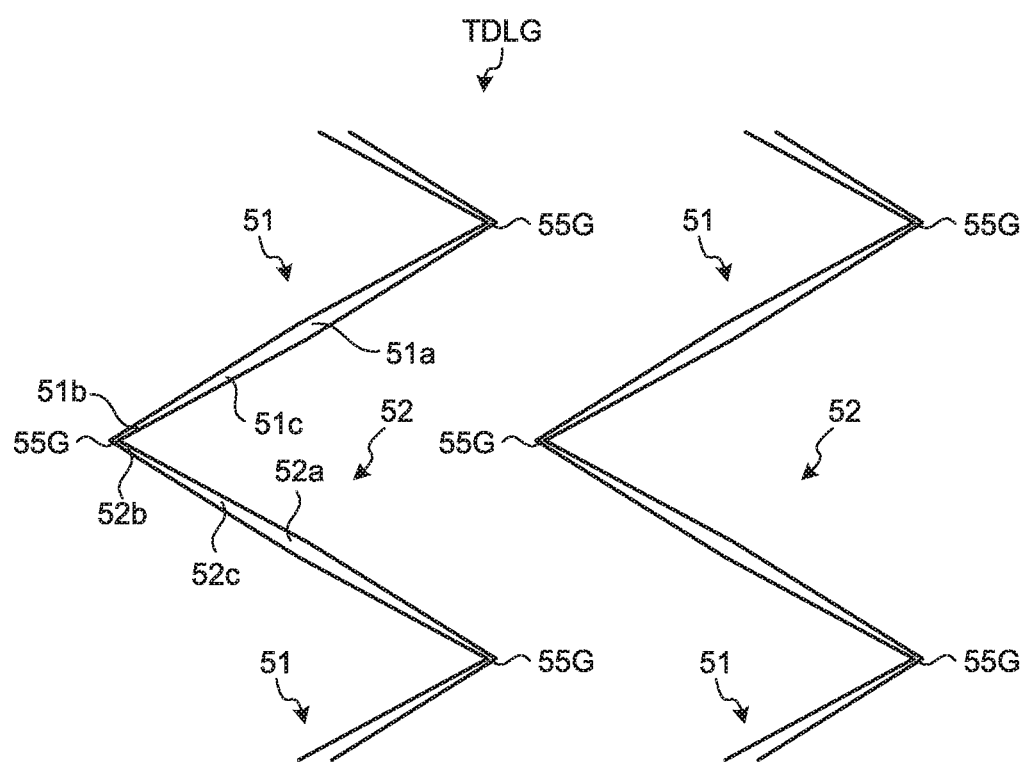
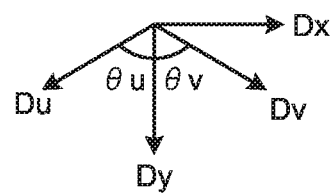

INPUT DETECTION DEVICE

CROSS-REFERENCE TO RELATED APPLICATIONS

This application is a continuation of U.S. patent application Ser. No. 15/608,236, filed on May 30, 2017, which application claims priority from Japanese Application No. 2016-113648, filed on Jun. 7, 2016, the contents of which are incorporated by reference herein in its entirety.

BACKGROUND

1. Technical Field

The present invention relates to an input detection device which is capable of detecting an external proximity object, and a display device with a touch detection function.

2. Description of the Related Art

In recent years, a so-called touch panel, which is a detection device capable of detecting an external proximity object, is gaining attention. A touch panel is used for a display device with a touch detection function which is mounted on or integrated with a display device such as a liquid crystal display device. The display device with a touch detection function causes the display device to display various button images and the like so that information can be input by the touch panel instead of regular mechanical buttons. A display device with a touch detection function, provided with such a touch panel, does not require an input device such as a keyboard, a mouse or a keypad, and is increasingly used for a portable information terminal, such as a mobile phone, in addition to a computer.

With a detection device which is capable of detecting an external proximity object, a reduction in the resistance of a detection electrode is desired in order to achieve a reduction in the thickness, an increase in the screen size, or an increase in definition. A translucent electrode made of indium tin oxide (ITO) or the like is used for the detection electrode. To reduce the resistance of the detection electrode, it is effective to use a conductive material such as a metal material. If a light shielding metal material is used for the detection electrode, transmittance of a display region is reduced, and thus there is a need to thin the metal material and to provide an opening portion between thin lines. However, when a plurality of thin lines are arranged regularly at small intervals, there is a problem that a moire pattern is caused between pixels and the thin line pattern. For example, Japanese Patent Application Laid-open Publication No. 2014-191660 describes a display device for suppressing generation of a moire pattern.

SUMMARY

However, there is a demand to further reduce generation of a moire pattern without depending on such a method.

The present invention has been made in view of a problem as described above, and there is a need for providing an input detection device that suppresses generation of a pattern such as a moire pattern, and a display device with a touch detection function.

According to one aspect, an input detection device includes a substrate, and a plurality of detection electrodes disposed on a plane parallel to the substrate, each detection electrode including a plurality of first conductive wires along a first direction, and a plurality of opening portions disposed between the plurality of first conductive wires. The first conductive wire includes a first wide portion, and a first narrow portion with a width smaller than a width of the first wide portion.

According to one aspect, an input detection device includes a substrate, and a plurality of detection electrodes disposed on a plane parallel to the substrate, each detection electrode including a plurality of first conductive wires along a first direction, and a plurality of opening portions disposed between the plurality of first conductive wires. The first conductive wire includes a first inclined portion with a width that is gradually reduced along the first direction.

According to one aspect, a display device with a touch detection function includes a substrate, detection electrodes disposed on a plane parallel to the substrate, each detection electrode including a plurality of first conductive wires along a first direction, and a plurality of second conductive wires along a second direction different from the first direction, and a display region overlapping the detection electrodes, where the display region includes a plurality of pixels that are arranged in a matrix, the pixel includes a plurality of subpixels corresponding to color regions of mutually different colors, the subpixels of mutually different colors are arranged in a first pixel direction that is a direction forming an angle with the first direction, and a distance, along the first pixel direction, between a connection portion of the first conductive wire and the second conductive wire and a midpoint of a line joining adjacent connection portions is equal to or greater than a width of the pixel in the first pixel direction.

BRIEF DESCRIPTION OF THE DRAWINGS

FIG. 12 is an enlarged view of a connection portion of the detection electrode according to the first embodiment;

FIG. 14 is an enlarged view of a connection portion of the dummy electrode according to the first embodiment;

FIG. 15 is an enlarged view of a connection portion of a detection electrode according to a second embodiment;

FIG. 16 is an enlarged view of a connection portion of a detection electrode according to a third embodiment;

FIG. 18 is an enlarged view of a connection portion of a detection electrode according to a fifth embodiment;

FIG. 19 is an enlarged view of a connection portion of a detection electrode according to a sixth embodiment;

FIG. 21 is a plan view illustrating a detection electrode according to an eighth embodiment;

DETAILED DESCRIPTION

Figure 1:
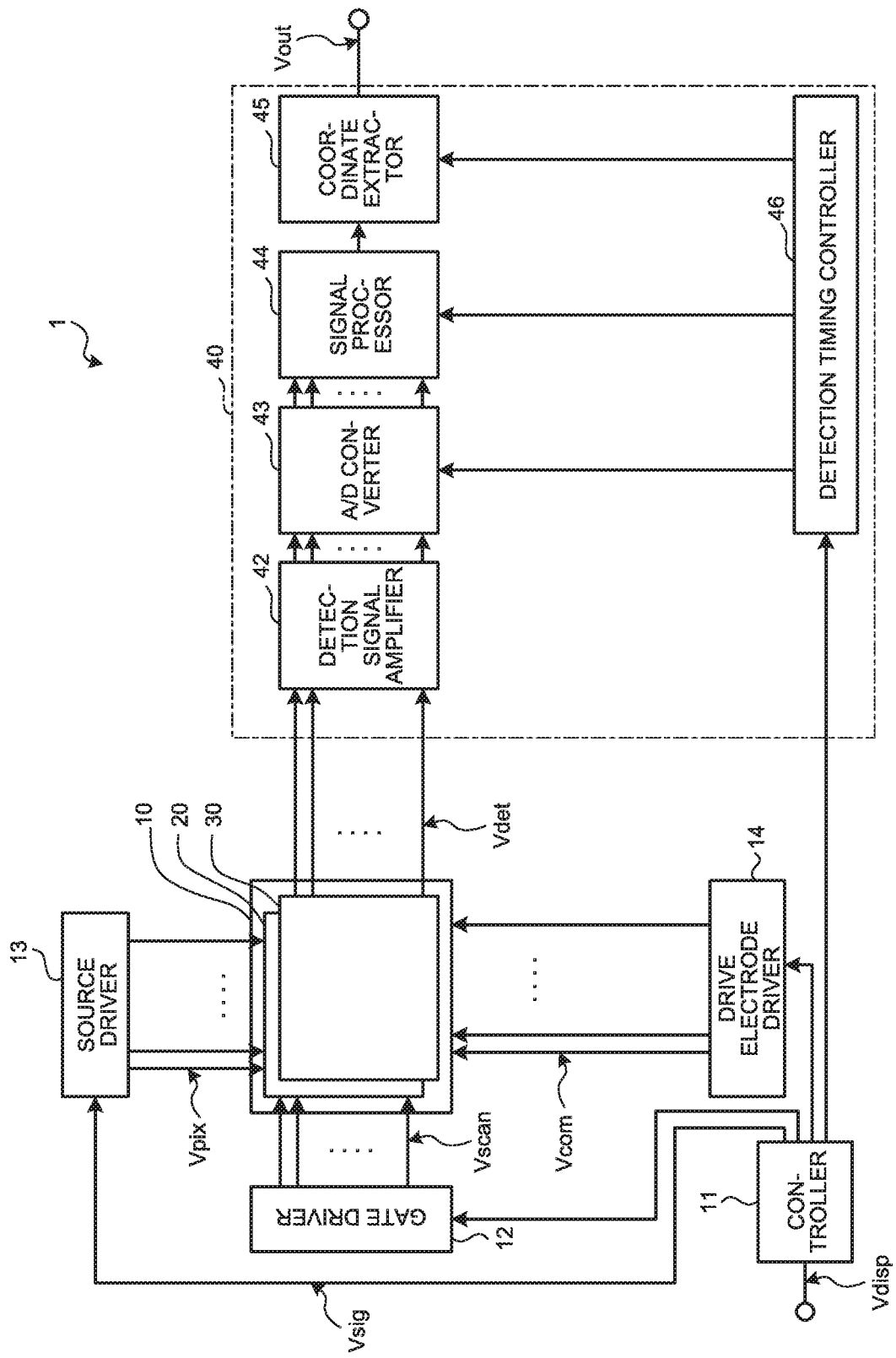
FIG. 1 is a block diagram illustrating an example configuration of a display device with a touch detection function according to a first embodiment.

Hereinafter, each embodiment of the present invention will be described with reference to the drawings. The disclosure is only an example, and it is needless to say that modifications that are readily made by those skilled in the art within the spirit of the invention are included in the scope of the present invention. For the sake of clear description, the width, the thickness, the shape and the like of each part are illustrated in the drawings more schematically than in actual modes, but the drawings illustrate only examples, and are not for limiting the interpretation of the present invention. In the present specification and in each drawing, the same elements as those described with reference to previously described drawings are denoted by the same reference signs, and detailed description thereof is omitted as appropriate.

First Embodiment

FIG. 1 is a block diagram illustrating an example configuration of a display device with a touch detection function according to a first embodiment. A display device 1 with a touch detection function includes a display unit 10 with a touch detection function, a controller 11, a gate driver 12, a source driver 13, a drive electrode driver 14, and a touch detector (simply referred to also as a detector) 40. The display unit 10 with a touch detection function is of a so-called in-cell type. A display panel 20 is a liquid crystal display device, for example. A touch panel 30 is of a capacitive type, for example.

The display unit 10 with a touch detection function may be of an on-cell type. The display panel 20 may be an organic EL display device, for example. The touch panel 30 may be a film touch panel, for example. The gate driver 12, the source driver 13, or the drive electrode driver 14 may be provided to the display unit 10 with a touch detection function.

As will be described later, the display panel 20 is a device which performs display by sequentially scanning over horizontal lines, one at a time, according to scanning signals Vscan supplied by the gate driver 12. The controller 11 is a circuit (a control device) for controlling the gate driver 12, the source driver 13, the drive electrode driver 14, and the touch detector 40 to be synchronously operated by supplying control signals to each of the gate driver 12, the source driver 13, the drive electrode driver 14, and the touch detector 40 based on an externally supplied video signal Vdisp.

The gate driver 12 has a function for sequentially selecting horizontal lines, which are targets of display driving of the display unit 10 with a touch detection function, one at a time, based on a control signal supplied by the controller 11.

The source driver 13 is a circuit for supplying a pixel signal Vpix to each subpixel SPix, described later, of the display unit 10 with a touch detection function based on a control signal Vsig supplied by the controller 11.

The drive electrode driver 14 is a circuit for supplying a drive signal Vcom to a drive electrode COML, described later, of the display unit 10 with a touch detection function based on a control signal supplied by the controller 11.

The touch detector 40 is a circuit for detecting presence/absence of a touch (a state of contact or proximity described later) on the touch panel 30 based on a control signal supplied by the controller 11 and a detection signal Vdet supplied by the touch panel 30 of the display unit 10 with a touch detection function, and for determining coordinates or the like in a touch detection region in the case of presence of a touch. The touch detector 40 includes a detection signal amplifier 42, an A/D converter 43, a signal processor 44, a coordinate extractor 45, and a detection timing controller 46.

The detection signal amplifier 42 amplifies the detection signal Vdet supplied by the touch panel 30. The detection signal amplifier 42 may include an analog low-pass filter for removing a high-frequency component (a noise component) contained in the detection signal Vdet, and for extracting and outputting each touch component.

(Basic Principle of Capacitive Proximity Detection)

Figure 2:
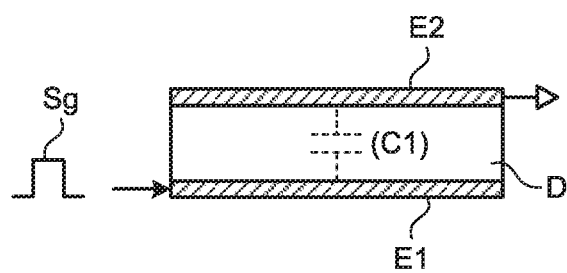
FIG. 2 is a schematic diagram for describing a basic principle of a capacitive touch detection method, the diagram illustrating a state where a finger is neither in contact nor in proximity of the display device.
Figure 3:
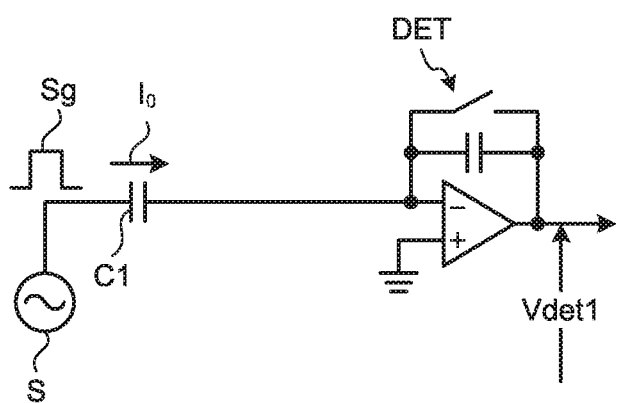
FIG. 3 is a circuit diagram for a state illustrated in FIG. 2.
Figure 4:
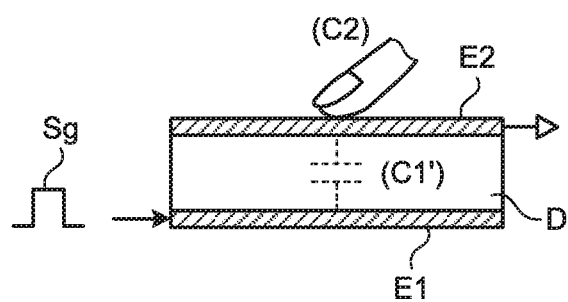
FIG. 4 is a schematic diagram for describing the basic principle of the capacitive touch detection method, the diagram illustrating a state where a finger is in contact or in proximity of the display device.
Figure 5:
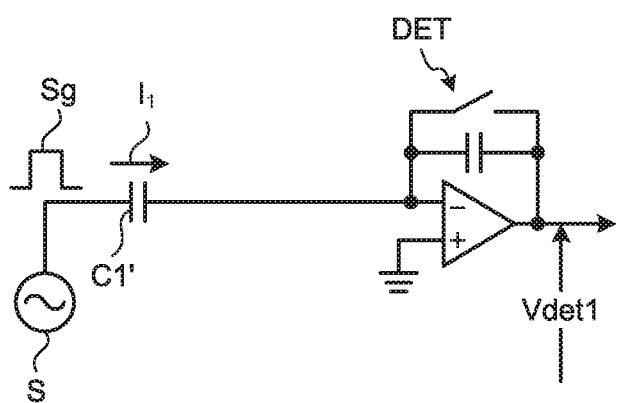
FIG. 5 is a circuit diagram for a state illustrated in FIG. 4.
Figure 6:
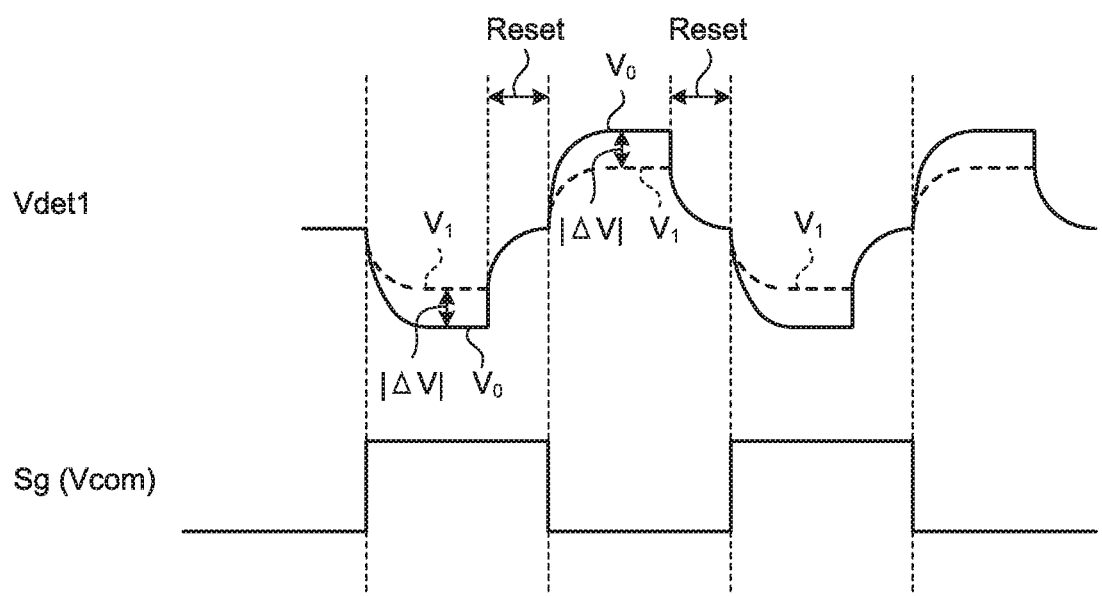
FIG. 6 is a diagram illustrating examples of waveforms of a drive signal and a detection signal.

The touch panel 30 operates according to a basic principle of capacitive proximity detection, and outputs a detection signal Vdet. A basic principle of touch detection at the display unit 10 with a touch detection function according to the first embodiment will be described with reference to FIGS. 1 to 6. FIG. 2 is a schematic diagram for describing a basic principle of a capacitive touch detection method, the diagram illustrating a state where a finger is neither in contact nor in proximity of the display device. FIG. 3 is a circuit diagram for a state illustrated in FIG. 2. FIG. 4 is a schematic diagram for describing the basic principle of the capacitive touch detection method, the diagram illustrating a state where a finger is in contact or in proximity of the display device. FIG. 5 is a circuit diagram for a state illustrated in FIG. 4. FIG. 6 is a diagram illustrating examples of waveforms of a drive signal and a detection signal. An external object may be any object that generates capacitance, and may be a finger or a stylus, for example. In the first embodiment, description is given citing a finger as the external object.

For example, as illustrated in FIGS. 2 and 4, a capacitive element C1 and a capacitive element C1' include a drive electrode E1 and a detection electrode E2 as a pair of electrodes which are disposed facing each other with a dielectric body D interposed therebetween. As illustrated in FIG. 3, one end of the capacitive element C1 is coupled to an AC signal source (a drive signal source) S, and the other end of the capacitive element C1 is coupled to a voltage detector (a touch detector) DET. The voltage detector DET is an integrating circuit included in the detection signal amplifier 42 as illustrated in FIG. 1, for example.

When an AC rectangular wave Sg of a predetermined frequency (for example, around several kHz to several hundreds of kHz) is applied to the drive electrode E1 (one end of the capacitive element C1) from the AC signal source S, an output waveform (a detection signal Vdet1) appears through the voltage detector DET coupled to the detection electrode E2 (the other end of the capacitive element C1) side. The AC rectangular wave Sg corresponds to a touch drive signal Vcomt described later.

As illustrated in FIGS. 2 and 3, in a state where a finger is not in contact (or in proximity) (a non-contact state), an electric current $I_0$ according to a capacitance value of the capacitive element C1 flows in accordance with charge and discharge on the capacitive element C1. As illustrated in FIG. 6, the voltage detector DET converts a change in the electric current $I_0$ according to the AC rectangular wave Sg into a change in a voltage (a waveform $V_0$ indicated by the solid line).

On the other hand, in a state (a contact state) where a finger is in contact (or in proximity), as illustrated in FIG. 4, a capacitance C2 generated by the finger is in contact or in proximity to the detection electrode E2, and thus, a fringe capacitance between the drive electrode E1 and the detection electrode E2 is blocked. Accordingly, the capacitance value of the capacitive element C1' is smaller than the capacitance value of the capacitive element C1. As illustrated in FIG. 5, an electric current $I_1$ flows through the capacitive element C1'. As illustrated in FIG. 6, the voltage detector DET converts a change in the electric current $I_1$ according to the AC rectangular wave Sg into a change in a voltage (a waveform $V_1$ indicated by the dotted line). In this case, the amplitude of the waveform $V_1$ is smaller than the amplitude of the waveform $V_0$ mentioned above. Accordingly, an absolute value $|\Delta V|$ of the voltage difference between the waveform $V_0$ and the waveform $V_1$ is changed according to an influence of an external object, such as a finger, coming into proximity. The voltage detector DET desirably detects the absolute value $|\Delta V|$ of the voltage difference between the waveform $V_0$ and the waveform $V_1$ with high accuracy. For this purpose, a Reset period for resetting charge and discharge of capacitor according to the frequency of the AC rectangular wave Sg is more desirably provided by switching in the circuit.

The touch panel 30 illustrated in FIG. 1 performs touch detection by sequentially scanning over detection blocks, one at a time, according to a drive signal Vcom supplied by the drive electrode driver 14.

The touch panel 30 includes a plurality of detection electrodes TDL described later. The touch panel 30 outputs a detection signal Vdet1 for each detection block from the detection electrode TDL and through the voltage detector DET illustrated in FIG. 3 or 5, and supplies the signal to the A/D converter 43 of the touch detector 40.

The A/D converter 43 is a circuit for sampling each analog signal output from the detection signal amplifier 42 at a timing synchronized with the drive signal Vcom and converting the signal into a digital signal.

The signal processor 44 includes a digital filter for reducing frequency components (noise components), contained in the output signal of the A/D converter 43, other than the frequency of sampling of the drive signal Vcom. The signal processor 44 is a logic circuit for detecting presence/absence of a touch on the touch panel 30 based on the output signal of the A/D converter 43. The signal processor 44 performs a process of extracting only the voltage of the difference caused by a finger. The voltage of the difference caused by a finger is the absolute value $|\Delta V|$ of the difference between the waveform $V_0$ and the waveform $V_1$ described above. The signal processor 44 may determine the average value of the absolute value $|\Delta V|$ by performing calculation of averaging the absolute value $|\Delta V|$ of one detection block. The signal processor 44 may thereby reduce the influence of a noise. The signal processor 44 compares the voltage of the difference caused by a detected finger and a predetermined threshold voltage, and if the threshold voltage is reached or exceeded, a contact state of a finger approaching from outside is determined, and if the threshold voltage is not reached, a non-contact state of a finger is determined. The touch detector 40 is capable of detecting a touch in this manner.

The coordinate extractor 45 is a logic circuit for determining touch panel coordinates when a touch is detected by the signal processor 44. The detection timing controller 46 performs control in such a way that the A/D converter 43, the signal processor 44, and the coordinate extractor 45 operate in synchronization with one another. The coordinate extractor 45 outputs the touch panel coordinates as a signal output Vout.

Figure 7:
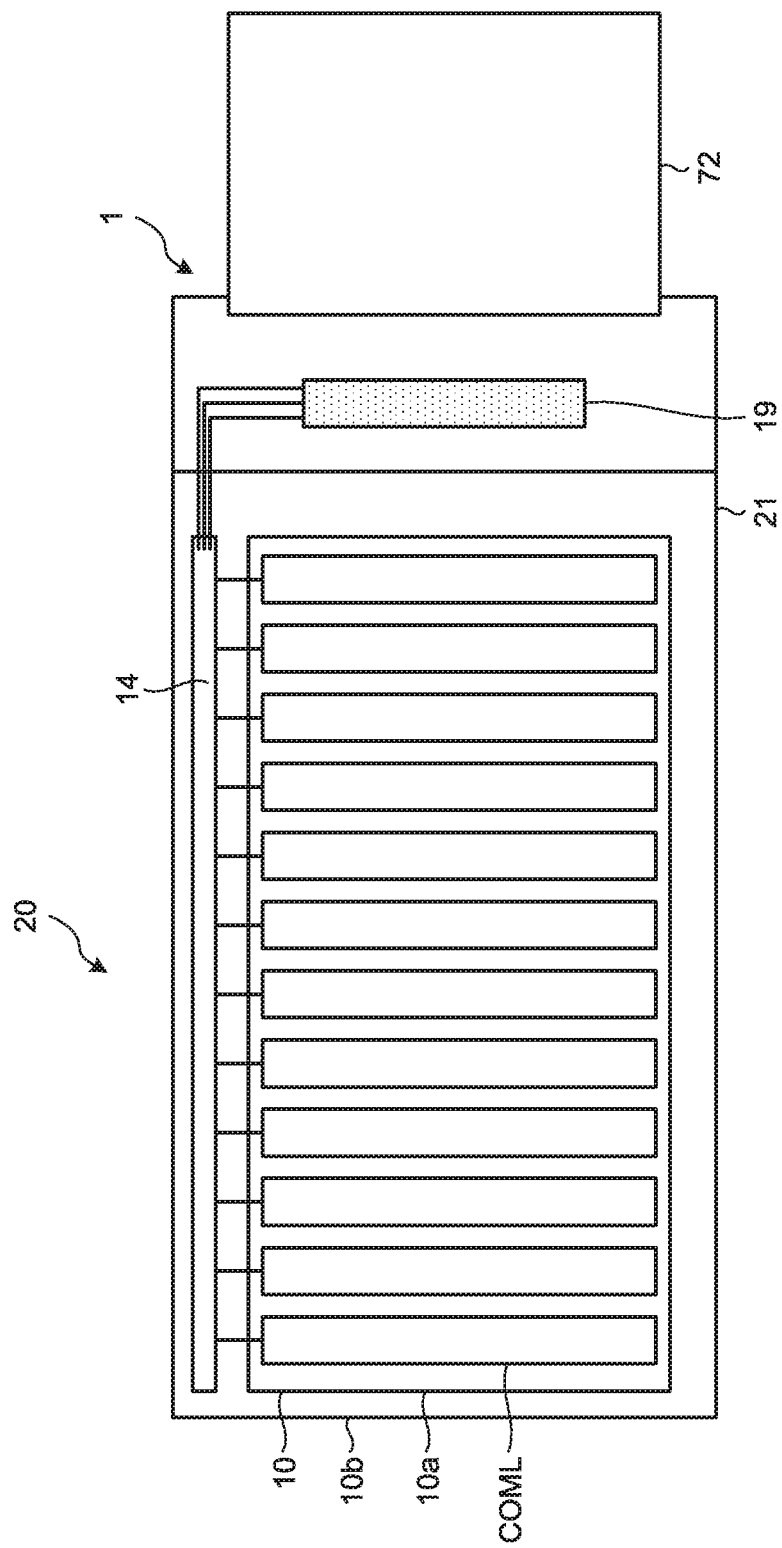
FIG. 7 is a diagram illustrating an example of a module on which the display device with a touch detection function is mounted.
Figure 8:
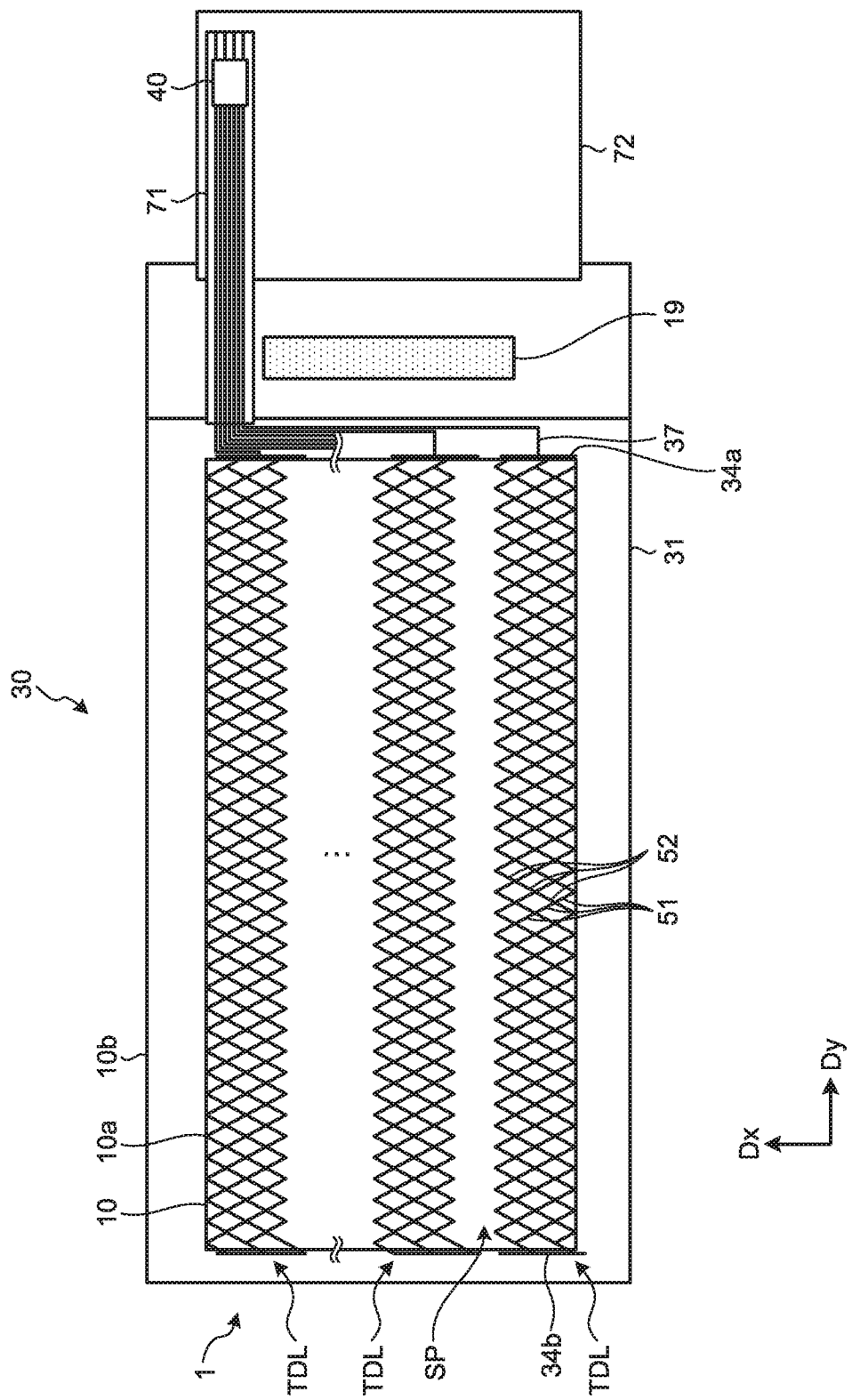
FIG. 8 is a diagram illustrating an example of a module on which the display device with a touch detection function is mounted.
Figure 9:
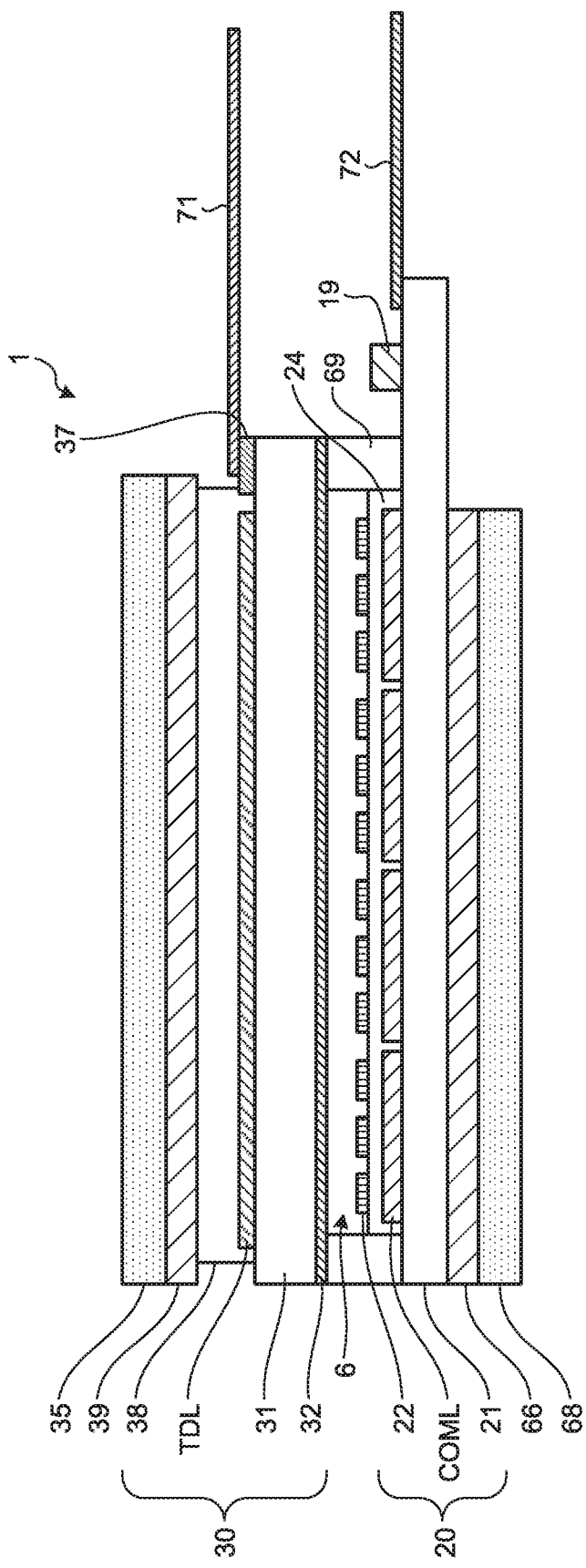
FIG. 9 is a cross-sectional view illustrating a schematic cross-sectional structure of the display device with a touch detection function according to the first embodiment.

FIGS. 7 and 8 are diagrams illustrating examples of a module on which the display device with a touch detection function is mounted. FIG. 7 is a plan view illustrating an example of the drive electrode, and FIG. 8 is a plan view illustrating an example of the detection electrode. FIG. 9 is a cross-sectional view illustrating a schematic cross-sectional structure of the display device with a touch detection function according to the first embodiment.

As illustrated in FIG. 9, the display unit 10 with a touch detection function includes the display panel 20, the touch panel 30 facing a surface of the display panel 20 in a perpendicular direction, and a liquid crystal layer 6 disposed between the display panel 20 and the touch panel 30.

The display panel 20 includes a thin film transistor (TFT) board 21 as a circuit board, a plurality of pixel electrodes 22 arranged in a matrix on a plane parallel to the TFT board 21, a plurality of drive electrodes COML disposed between the TFT board 21 and the pixel electrodes 22, and an insulating layer 24 insulating the pixel electrodes 22 from the drive electrodes COML. A polarizing plate 68 is provided to the TFT board 21, on the opposite side of the drive electrodes COML, with an adhesive layer 66 interposed therebetween. In the following description, the direction of the polarizing plate 68 from the TFT board 21 will be referred to as the lower side, and the direction of the drive electrodes COML from the TFT board 21 will be referred to as the upper side.

As illustrated in FIG. 7, the TFT board 21 includes a display region 10a, and a frame region 10b surrounding the display region 10a. The TFT board 21 has a chip on glass (COG) 19 mounted thereon, and is coupled to a flexible printed circuit board 72. The COG 19 is a chip of an IC driver mounted on the TFT board 21, and each circuit necessary for display operation (the controller 11, the gate driver 12, the source driver 13 and the like illustrated in FIG. 1) is built in the COG 19. The COG 19 and the drive electrode driver 14 are provided in the frame region 10b. A video signal Vdisp and a power supply voltage are supplied from outside to the COG 19 through the flexible printed circuit board 72. The gate driver 12, the source driver 13, or the drive electrode driver 14 may be formed to the TFT board 21. The drive electrode driver 14 may be built in the COG 19. In this case, the frame region 10b may be made smaller.

The touch panel 30 includes a substrate 31, a color filter 32 disposed on one surface of the substrate 31, detection electrodes TDL disposed on the other surface of the substrate 31, a protective layer 38, and a flexible printed circuit board 71. As illustrated in FIG. 9, the color filter 32 is provided below the substrate 31, and the detection electrodes TDL are provided on the substrate 31. The protective layer 38 is a layer which is provided on the detection electrodes TDL to protect the detection electrodes TDL. A translucent resin, such as an acrylic resin, is used for the protective layer 38. A polarizing plate 35 is provided above the protective layer 38, with an adhesive layer 39 interposed therebetween. The touch detector 40 (see FIG. 1) is mounted on the flexible printed circuit board 71. The touch detector 40 does not necessarily have to be mounted on the flexible printed circuit board 71, and may be mounted on another substrate which is coupled to the flexible printed circuit board 71.

The substrate 31 is a glass substrate with translucency, for example, and faces the TFT board 21 in a direction perpendicular to the surface of the TFT board 21 illustrated in FIG. 7. As illustrated in FIG. 8, the plurality of detection electrodes TDL are disposed in a region overlapping the display region 10a. As illustrated in FIG. 8, a space SP is formed between adjacent detection electrodes TDL.

As illustrated in FIG. 8, the detection electrodes TDL include a plurality of first conductive wires 51, and a plurality of second conductive wires 52. The first conductive wire 51 and the second conductive wire 52 are inclined in opposite directions from each other with respect to a direction parallel to one side of the display region 10a. The first conductive wires 51 and the second conductive wires 52 disposed on both sides of the display region 10a are coupled to a connection wire 34a or a connection wire 34b disposed in the frame region 10b. The plurality of first conductive wires 51 and the plurality of second conductive wires 52 are thereby electrically coupled to each other to function as one detection electrode TDL. A wire 37 is coupled to the connection wire 34a. The detection electrode TDL and the flexible printed circuit board 71 are coupled to each other by the wire 37. The detection electrode TDL may be partially disposed outside the display region (10a) (in the frame region 10b). The connection wire 34a and the connection wire 34b do not have to be in the frame region 10b, and may be disposed in the display region 10a instead. The connection wire 34a and the connection wire 34b may be coupled to the touch detector 40 by the wire 37. That is, the connection wire 34a and the connection wire 34b may be wires for coupling the detection electrode TDL and the touch detector 40.

The TFT board 21 and the substrate 31 are disposed with a predetermined gap formed therebetween by a spacer 69. The liquid crystal layer 6 is provided in the space surrounded by the TFT board 21, the substrate 31, and the spacer 69. The liquid crystal layer 6 modulates light passing through the liquid crystal layer 6 according to the state of an electrical field. For example, the display device 1 with a touch detection function is a display device of a fringe field switching (FFS) method. An alignment film may be disposed between the liquid crystal layer 6 illustrated in FIG. 9 and the display panel 20, and between the liquid crystal layer 6 and the touch panel 30.

At the time of display operation, the display device 1 with a touch detection function sequentially scans over horizontal lines, one at a time. On the other hand, at the time of touch detection operation, the display device 1 with a touch detection function sequentially scans over detection lines, one at a time, by sequentially applying drive signals Vcom from the drive electrode driver 14 to the drive electrodes COML.

As illustrated in FIG. 7, a plurality of drive electrodes COML are provided in a region overlapping the display region 10a. A conductive material having translucency, such as indium tin oxide (ITO), is used for the drive electrode COML. The plurality of drive electrodes COML are divided into a plurality of drive electrode blocks. The drive electrode blocks are arranged along a direction of one side of the display region 10a, and are provided at intervals along a direction along the other side of the display region 10a. The drive electrodes COML are each coupled to the drive electrode driver 14. The drive electrodes COML do not have to be divided in a stripe manner. For example, the drive electrodes COML may be comb-shaped. The shape of slits dividing the drive electrodes COML may be straight or curved.

The detection electrodes TDL are along a direction intersecting the longitudinal direction of the drive electrode blocks. A plurality of detection electrodes TDL are arranged, at intervals, in a longitudinal direction of the drive electrodes COML. The detection electrode TDL is respectively coupled to an input of the detection signal amplifier 42 of the touch detector 40 (see FIG. 1). The detection electrodes TDL face the drive electrodes COML in a direction perpendicular to the surface of the TFT board 21 (see FIG. 9). That is, the plurality of drive electrodes COML and the plurality of detection electrodes TDL are disposed to three-dimensionally intersect with each other. A capacitance is generated at a part where the drive electrode COML and the detection electrode TDL overlap each other. The drive electrodes COML function as common electrodes for applying common potential to a plurality of pixel electrodes 22 of the display panel 20, and also function as drive electrodes at the time of performing touch detection by a mutual capacitance method of the touch panel 30.

At the time of performing touch detection operation by the mutual capacitance method, drive electrode blocks are sequentially selected, one at a time. When a detection signal Vdet1 is output from the detection electrode TDL, touch detection for one detection block is performed. That is, the drive electrode block corresponds to the drive electrode E1 according to the basic principle of the touch detection operation by the mutual capacitance method described above, and the detection electrode TDL corresponds to the detection electrode E2. The touch panel 30 detects a touch input according to the basic principle described above. The detection electrodes TDL and the drive electrodes COML which are intersected three-dimensionally form a matrix capacitive touch sensor. Accordingly, by scanning over the entire touch detection surface of the touch panel 30, a position where an external conductor contacted or came into proximity may be detected.

As an example of operation method of the display device 1 with a touch detection function, the display device 1 with a touch detection function performs touch detection operation (a detection period) and display operation (a display operation period) in a time-divided manner. The touch detection operation and the display operation may be divided in an arbitrary manner.

In the first embodiment, the drive electrode COML serves also as a common electrode of the display panel 20, and thus, in the display operation period, the controller 11 supplies a drive signal Vcom, which is a common electrode potential for display, to the drive electrode COML selected through the drive electrode driver 14.

In the case of performing the detection operation in the detection period by only the detection electrodes TDL, without using the drive electrodes COML, such as in the case of performing touch detection according to a touch detection principle by self-capacitance method described later, the drive electrode driver 14 may supply a drive signal Vcom for touch detection to the detection electrode TDL.

Figure 10:
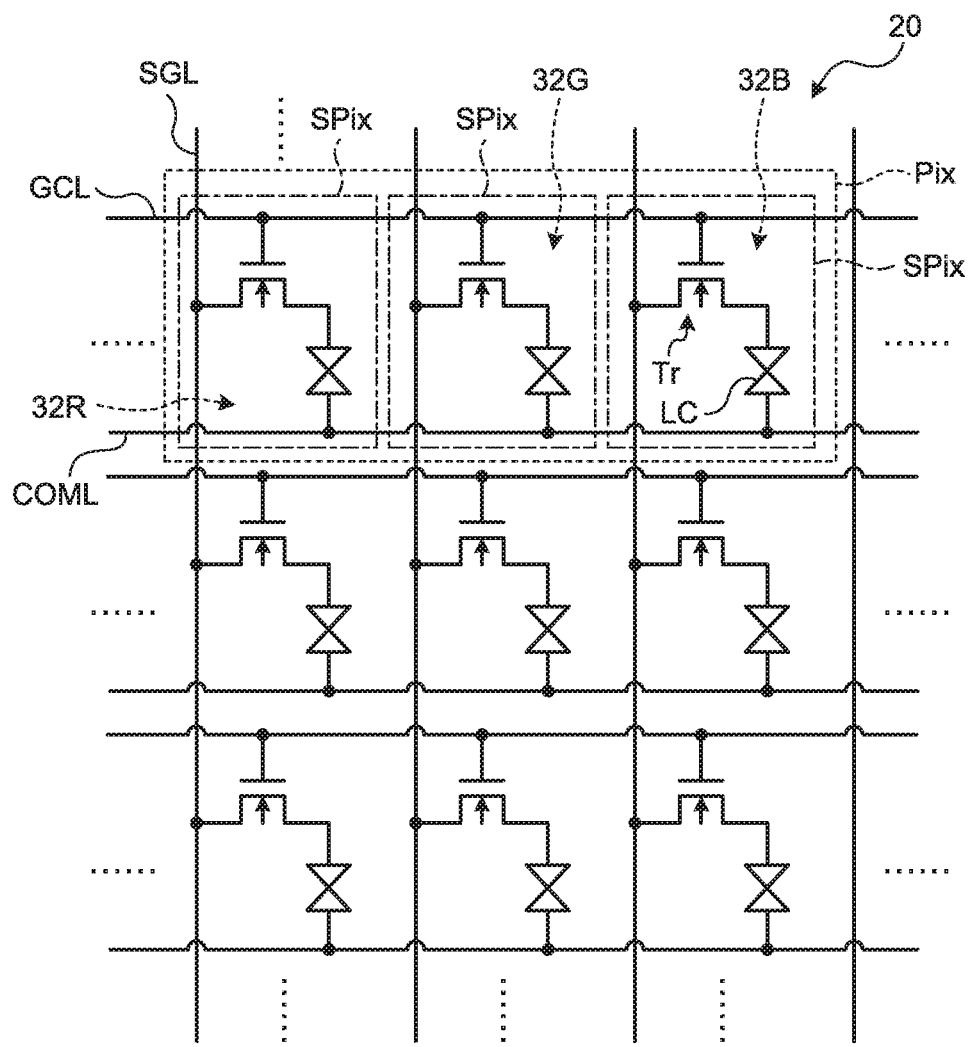
FIG. 10 is a circuit diagram illustrating a pixel arrangement of the display device with a touch detection function according to the first embodiment.

FIG. 10 is a circuit diagram illustrating a pixel arrangement of the display device with a touch detection function according to the first embodiment. A thin film transistor element (hereinafter "TFT element") Tr of each subpixel SPix, and wires such as pixel signal lines SGL for supplying pixel signals Vpix to respective pixel electrodes 22 and scanning signal lines GCL for driving respective TFT elements Tr, illustrated in FIG. 10, are disposed on the TFT board 21 illustrated in FIG. 9. The pixel signal lines SGL and the scanning signal lines GCL are along a plane that is parallel to the surface of the TFT board 21.

The display panel 20 illustrated in FIG. 10 includes a plurality of subpixels SPix that are arranged in a matrix. Each subpixel SPix includes a TFT element Tr and a liquid crystal element LC. The TFT element Tr is an n-channel metal oxide semiconductor (MOS) TFT, for example. One of the source and the drain of the TFT element Tr is coupled to the pixel signal line SGL, and the other of the source and the drain is coupled to one end of the liquid crystal element LC, and the gate is coupled to the scanning signal line GCL. The other end of the liquid crystal element LC is coupled to the drive electrode COML.

A subpixel SPix is coupled by the scanning signal line GCL to another subpixel SPix belonging to the same row. The scanning signal line GCL is coupled to the gate driver 12 (see FIG. 1). A scanning signal Vscan is supplied to the scanning signal line GCL by the gate driver 12. The subpixel SPix is coupled by the pixel signal line SGL to another subpixel SPix belonging to the same column. The pixel signal line SGL is coupled to the source driver 13 (see FIG. 1). A pixel signal Vpix is supplied to the pixel signal line SGL by the source driver 13. Moreover, the subpixel SPix is coupled by the drive electrode COML to another subpixel SPix belonging to the same row. The drive electrode COML is coupled to the drive electrode driver 14 (see FIG. 1). A drive signal Vcom is supplied to the drive electrode COML by the drive electrode driver 14. That is, one drive electrode COML is shared by a plurality of subpixels SPix belonging to one same row. The longitudinal direction of the drive electrode COML is parallel to the longitudinal direction of the scanning signal line GCL. The longitudinal direction of the drive electrode COML does not have to be parallel to the longitudinal direction of the scanning signal line GCL. For example, the longitudinal direction of the drive electrode COML may be a direction that is parallel to the longitudinal direction of the pixel signal line SGL.

The gate driver 12 illustrated in FIG. 1 sequentially supplies scanning signals Vscan to a plurality of scanning signal lines GCL. The scanning signal Vscan (see FIG. 1) is applied, through the scanning signal line GCL, to the gate of the TFT element Tr of a subpixel SPix. A plurality of subpixels SPix belonging to the same row are sequentially selected as the target of display driving. The display device 1 with a touch detection function performs display on a per-row basis by the source driver 13 supplying the pixel signal Vpix to a plurality of subpixels SPix belonging to the same row. At the time of the display operation, the drive electrode driver 14 applies the drive signal Vcom to the drive electrode COML.

The color filter 32 illustrated in FIG. 9 includes color regions 32R colored in red (R), color regions 32G colored in green (G), and color regions 32B colored in blue (B), for example. The color regions 32R, the color regions 32G, and the color regions 32B are arranged in one column, respectively. The column of the color regions 32R, the column of the color regions 32G, and the column of the color regions 32B are arranged in a direction orthogonal to the columns. One color region 32R, one color region 32G, and one color region 32B each corresponds to one subpixel SPix illustrated in FIG. 10 described above. A pixel Pix is formed by a subpixel SPix corresponding to the color region 32R, a subpixel SPix corresponding to the color region 32G, and a subpixel SPix corresponding to the color region 32B. The display region 10a includes a plurality of pixels that are arranged in a matrix. As illustrated in FIG. 9, the color filter 32 faces the liquid crystal layer 6 in a direction perpendicular to the TFT board 21. The color filter 32 may be a combination of other colors as long as different colors are used. The color filter 32 is not limited to a combination of three colors, and may be a combination of four or more colors.

As illustrated in FIG. 10, a direction along which subpixels SPix of different colors are arranged (the longitudinal direction of the scanning signal line GCL) is given as a first pixel direction Dx, and a direction along which subpixels SPix of the same color are arranged (the longitudinal direction of the pixel signal line SGL) is given as a second pixel direction Dy. The second pixel direction Dy is a direction that is orthogonal to the first pixel direction Dx on a plane parallel to the touch panel 30.

Figure 11:
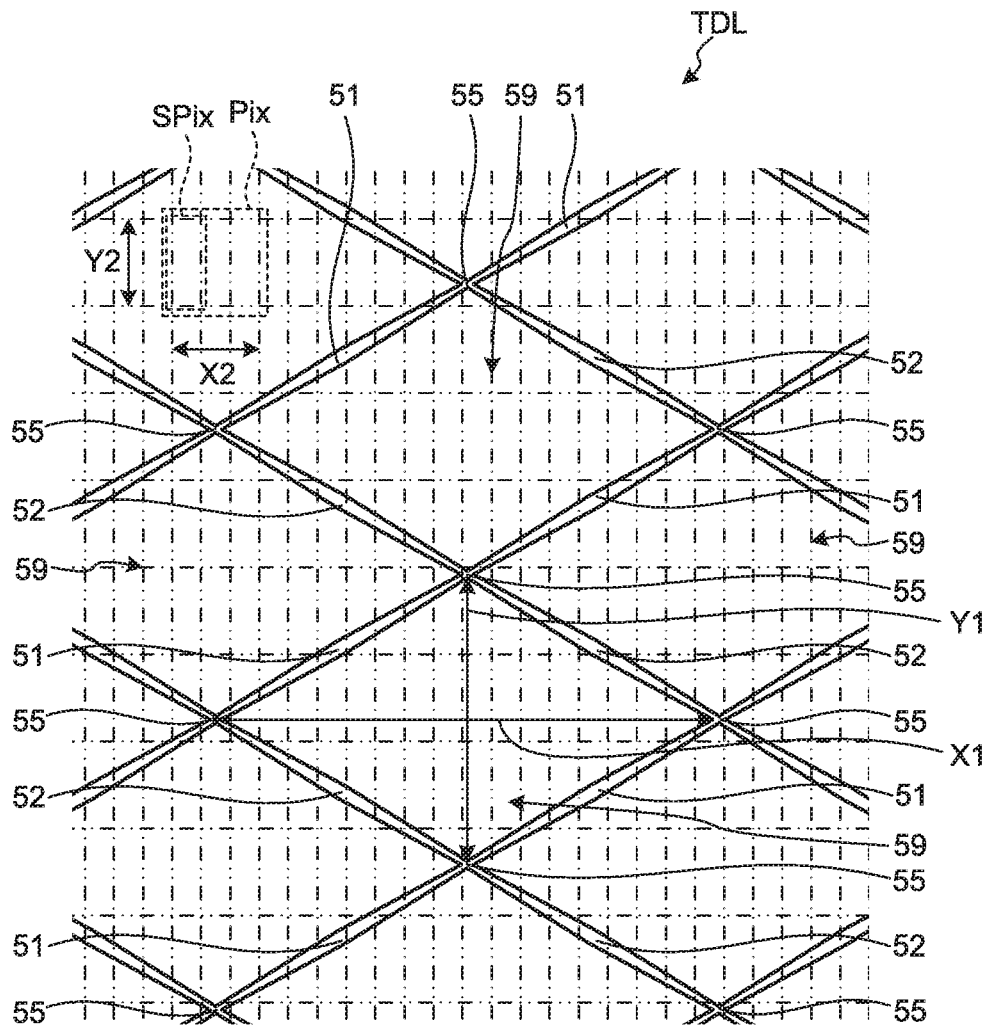
FIG. 11 is a plan view illustrating a detection electrode according to the first embodiment.
Figure 13:
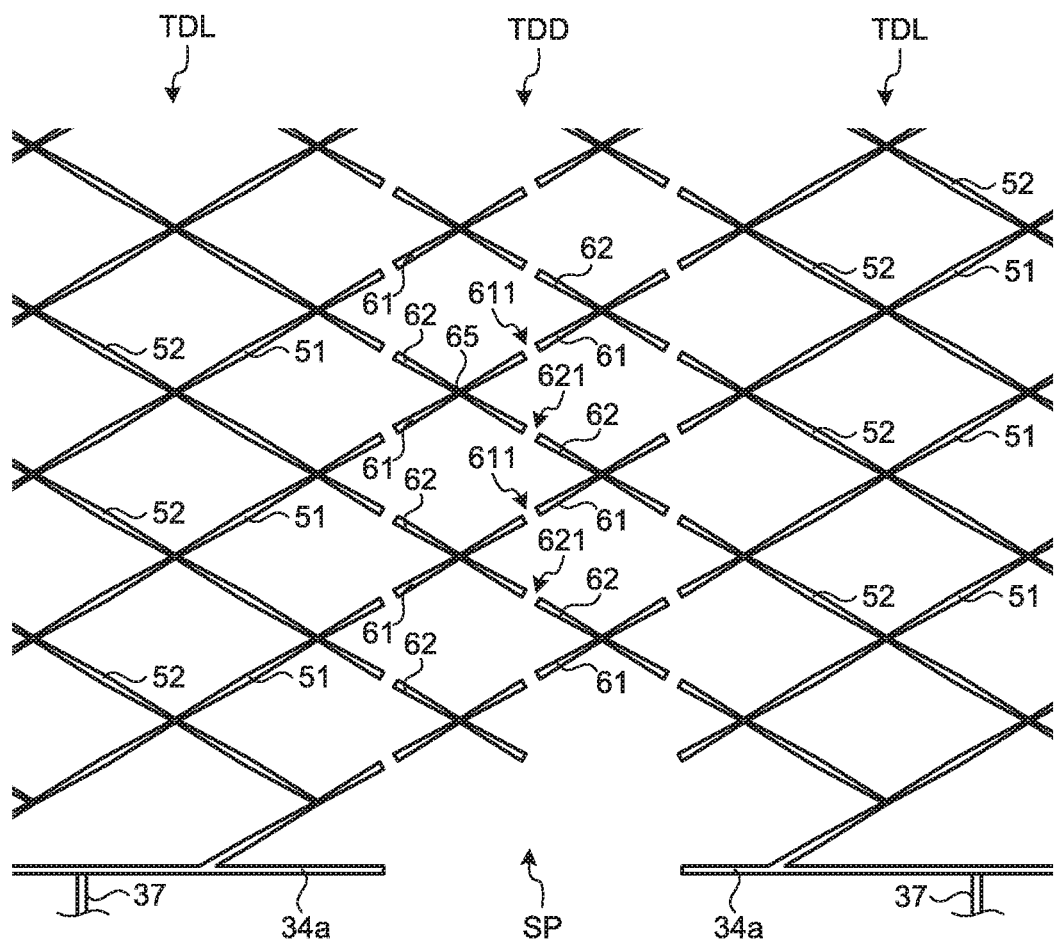
FIG. 13 is a plan view illustrating a dummy electrode according to the first embodiment.

FIG. 11 is a plan view illustrating a detection electrode according to the first embodiment. FIG. 12 is an enlarged view of a connection portion of the detection electrode according to the first embodiment. FIG. 13 is a plan view illustrating a dummy electrode according to the first embodiment. FIG. 14 is an enlarged view of a connection portion of the dummy electrode according to the first embodiment. The detection electrode TDL illustrated in FIG. 11 is a partial enlarged view of the detection electrode TDL illustrated in FIG. 8.

The first conductive wire 51 and the second conductive wire 52 are formed of one or more metals selected from aluminum (Al), copper (Cu), silver (Ag), molybdenum (Mo), chromium (Cr), and tungsten (W), for example. Alternatively, the first conductive wire 51 and the second conductive wire 52 are formed of an alloy including one or more metal materials selected from aluminum (Al), copper (Cu), silver (Ag), molybdenum (Mo), chromium (Cr), and tungsten (W). That is, the first conductive wire 51 and the second conductive wire 52 are light shielding metal wires. The first conductive wire 51 and the second conductive wire 52 may also have a conductive layer of translucent conductive oxide, such as ITO, or a conductive layer of organic conductive substance, such as conductive carbon or polymer molecules, stacked thereon in addition to the metal material(s) or the alloy of metal material(s) described above.

The resistance of the metal materials described above is lower than that of the translucent conductive oxide, such as ITO. Compared to the translucent conductive oxide, the metal materials described above have a light shielding property, and thus, the transmittance is possibly reduced or the detection electrode TDL possibly becomes visible. In the first embodiment, one detection electrode TDL includes a plurality of first conductive wires 51 and a plurality of second conductive wires 52, and the plurality of first conductive wires 51 and the plurality of second conductive wires 52 are disposed at intervals greater than the line widths thereof, and thus, reduction in resistance and invisibility are thus achieved. Parts where the first conductive wires 51 and the second conductive wires 52 are not disposed are made opening portions 59, that is, transmissive regions of the detection electrode TDL. The opening portion 59 is disposed between the first conductive wires 51, between the second conductive wires 52, or between the first conductive wire 51 and the second conductive wire 52. As illustrated in FIG. 11, the opening portion 59 is disposed at a region surrounded by two first conductive wires 51 and two second conductive wires 52.

The first conductive wire 51 and the second conductive wire 52 form an angle. The first conductive wire 51 is along a first direction Du, which forms an angle θu with the second pixel direction Dy. The second conductive wire 52 is along a second direction Dv, which forms an angle θv with the second pixel direction Dy. The second direction Dv is a direction different from the first direction Du. For example, the size of the angle θv is the same as the size of the angle θu. A plurality of first conductive wires 51 extend in a line along the first direction Du to form a column. The columns of the first conductive wires 51 are arranged in the second direction Dv at predetermined intervals. A plurality of second conductive wires 52 extend in a line along the second direction Dv to form a column. The columns of the second conductive wires 52 are arranged in the first direction Du at predetermined intervals. The first conductive wires 51 intersect with the second conductive wires 52. Accordingly, the detection electrode TDL forms a mesh pattern. That is, the detection electrode TDL includes connection portions 55, which are intersection points of the first conductive wires 51 and the second conductive wires 52. The connection portion 55 joins the first conductive wires 51 and the second conductive wires 52. Two first conductive wires 51 and two second conductive wires 52 are in contact with the connection portion 55.

The first conductive wires 51 are along the first direction Du different from the second pixel direction Dy, and the second conductive wires 52 are along the second direction Dv different from the second pixel direction Dy, and thus, the first conductive wires 51 and the second conductive wires 52 may be prevented from overlapping color regions of the color filter 32 of a specific color. Interference between pixels Pix and the detection electrode TDL is thereby made less likely. Because the detection electrode TDL forms a mesh pattern, the detection electrode TDL is not easily visible.

However, the meshed detection electrode TDL includes the first conductive wires 51 and the second conductive wires 52, the connection portions 55, and the opening portions 59 where the first conductive wires 51 and the second conductive wires 52 are not present, and thus, a difference is caused in a wiring density. A wiring density is the proportion of the region occupied by the detection electrode TDL (the first conductive wires 51 and the second conductive wires 52) in a minute unit region seen from a direction perpendicular to the display region 10a. For example, in a surrounding region of a connection portion 55 seen from a direction perpendicular to the display region 10a, the wiring density of a unit region including the connection portion 55 is higher than the wiring density of a unit region not including the connection portion 55. Therefore, a difference in transmittance is caused between parts of the detection electrode TDL where the wiring density is high and where the wiring density is low. A pattern which would affect visibility, such as a moire pattern, is possibly caused due to interference between a regular arrangement of parts with low transmittance and parts with high transmittance and the pixel arrangement. The present embodiment is capable of reducing the wiring density difference by adjusting the widths of the first conductive wire 51 and the second conductive wire 52. Details are given below.

As illustrated in FIG. 12, the first conductive wire 51 includes a first wide portion 51a, two first narrow portion 51b, and first inclined portions 51c. The first wide portion Ma is disposed halfway between two adjacent connection portions 55, for example. The width of the first wide portion 51a is gradually reduced as it gets closer to the connection portion 55. The edge of the first wide portion Ma is straight. A width W1, which is the maximum width of the first wide portion Ma, is about 4 µm, for example. The first narrow portion 51b is disposed closer to the connection portion 55 than the first wide portion Ma is. Specifically, the first narrow portion 51b is disposed near the connection portion 55. The width of the first narrow portion 51b is gradually reduced as it gets closer to the connection portion 55. The edge of the first narrow portion 51b is straight. A width W2, which is the minimum width of the first narrow portion 51b, is about 2 µm, for example. The width of the first narrow portion 51b is smaller than the width of the first wide portion 51a. The first inclined portion 51c is disposed between the first wide portion 51a and the first narrow portion 51b. The first inclined portion 51c joins the first wide portion 51a and the first narrow portion 51b. The width of the first inclined portion 51c is gradually reduced along the first direction Du. Specifically, the width of the first inclined portion 51c is gradually reduced from the first wide portion 51a toward the first narrow portion 51b. The edge of the first inclined portion 51c is straight. In other words, the width of the first conductive wire 51 is gradually reduced from a midpoint of a line segment joining two adjacent connection portions 55 toward the connection portions 55. The edge of the first conductive wire 51 is straight. That is, the first conductive wire 51 can be said to include only the first inclined portions 51c without including the first wide portion 51a and the first narrow portions 51b. The width W1 and the width W2 do not have to be the sizes described above. It is sufficient as long as the width W1 is at least greater than the width W2.

As illustrated in FIG. 12, the second conductive wire 52 includes a second wide portion 52a, two second narrow portions 52b, and second inclined portions 52c. The second wide portion 52a is disposed halfway between two adjacent connection portions 55, for example. The width of the second wide portion 52a is gradually reduced as it gets closer to the connection portion 55. The edge of the second wide portion 52a is straight. A width W3, which is the maximum width of the second wide portion 52a, is about 4 µm, for example. The second narrow portion 52b is disposed closer to the connection portion 55 than the second wide portion 52a is. Specifically, the second narrow portion 52b is disposed near the connection portion 55. The width of the second narrow portion 52b is gradually reduced as it gets closer to the connection portion 55. The edge of the second narrow portion 52b is straight. A width W4, which is the minimum width of the second narrow portion 52b, is about 2 µm, for example. The width of the second narrow portion 52b is smaller than the width of the second wide portion 52a. The second inclined portion 52c is disposed between the second wide portion 52a and the second narrow portion 52b. The second inclined portion 52c joins the second wide portion 52a and the second narrow portion 52b. The width of the second inclined portion 52c is gradually reduced along the second direction Dv. Specifically, the width of the second inclined portion 52c is gradually reduced from the second wide portion 52a toward the second narrow portion 52b. The edge of the second inclined portion 52c is straight. In other words, the width of the second conductive wire 52 is gradually reduced from a midpoint of a line segment joining two adjacent connection portions 55 toward the connection portions 55. The edge of the second conductive wire 52 is straight. That is, the second conductive wire 52 can be said to include only the second inclined portions 52c without including the second wide portion 52a and the second narrow portions 52b. The width W3 and the width W4 do not have to be the sizes described above. It is sufficient as long as the width W3 is at least greater than the width W4.

In this manner, the touch panel 30, which is an input detection device, includes the substrate 31, and the detection electrodes TDL provided on a plane that is parallel to the substrate 31. The detection electrode TDL includes a plurality of first conductive wires 51 along the first direction Du, and a plurality of second conductive wires 52 along the second direction Dv different from the first direction Du. The first conductive wire 51 includes the first wide portion 51a, and the first narrow portions 51b with a width smaller than the width of the first wide portion 51a.

Because the first conductive wire 51 includes the first narrow portions 51b, and the second conductive wire 52 includes the second narrow portions 52b, the wiring density at the surrounding region of the connection portion 55 tends to be low. That is, the first conductive wire 51 and the second conductive wire 52 have a wiring width that is different between a position away from the connection portion 55 and a position close to the connection portion 55. The wiring width of the first conductive wire 51 and the second conductive wire 52 at positions away from the connection portion 55 is greater than the wiring width at positions closer to the connection portion 55. Accordingly, in the present embodiment, the difference between the wiring density of the detection electrode TDL at a unit region including the connection portion 55 and the wiring density of the detection electrode TDL at a unit region not including the connection portion 55 may be reduced. The difference in the transmittance between the surrounding region of the connection portion 55 and a region other than the connection portion 55 is thereby reduced. Therefore, generation of a pattern due to regions of different transmittance being arranged next to one another is suppressed. Moreover, a moire pattern (interference fringes) which is caused when a regular arrangement of regions of different transmittance and a pixel arrangement are overlapped with a specific gap is suppressed. Accordingly, visibility of a displayed image is not easily obstructed.

As illustrated in FIG. 11, a distance X1 between two connection portions 55 that are adjacent to each other in the first pixel direction Dx is preferably two to six times a width X2 of a pixel Pix in the first pixel direction Dx. A distance Y1 between two connection portions 55 that are adjacent to each other in the second pixel direction Dy is preferably two to six times a width Y2 of a pixel Pix in the second pixel direction Dy. In such a case, an effect of suppressing occurrence of a pattern caused by regions of different transmittance being arranged next to one another is particularly effective. The distance X1 is preferably not an integral multiple of the width X2. The distance Y1 is preferably not an integral multiple of the distance Y2. This suppresses occurrence of a moire pattern.

If the first conductive wire 51 includes the first wide portion 51a and the first narrow portions 51b, the second conductive wire 52 does not necessarily have to include the second wide portion 52a and the second narrow portions 52b. Conversely, if the second conductive wire 52 includes the second wide portion 52a and the second narrow portions 52b, the first conductive wire 51 does not necessarily have to include the first wide portion 51a and the first narrow portions 51b. That is, it is sufficient as long as at least one of the first conductive wire 51 and the second conductive wire 52 includes a wide member (a wide portion) and a member with a width smaller than the width of the wide member (a narrow portion). The number of first narrow portions 51b and the number of second narrow portions 52b may be one instead of two. That is, the first narrow portion 51b may be provided at only one end of the first conductive wire 51, and the second narrow portion 52b may be provided at only one end of the second conductive wire 52.

As illustrated in FIG. 8, a space SP is provided between adjacent detection electrodes TDL. To suppress a difference between the way a displayed image is seen at a region overlapping the detection electrode TDL and the way the display image is seen at the space SP, a dummy electrode TDD is disposed as illustrated in FIG. 13.

As illustrated in FIG. 13, the dummy electrode TDD includes a plurality of first dummy wires 61, and a plurality of second dummy wires 62. For example, the first dummy wires 61 and the second dummy wires 62 are formed of the same material as the first conductive wires 51 and the second conductive wires 52.

The first dummy wire 61 and the second dummy wire 62 form an angle. The first dummy wire 61 is along the first direction Du. The second dummy wire 62 is along the second direction Dv. The first dummy wire 61 is disposed on the extension of the first conductive wire 51. The second dummy wire 62 is disposed on the extension of the second conductive wire 52. The first dummy wires 61 intersect with the second dummy wires 62. Accordingly, the dummy electrode TDD forms a mesh pattern. That is, the dummy electrode TDD includes connection portions 65.

The dummy electrode TDD is of the same material as the first conductive wire 51 and the second conductive wire 52, and is along the same directions. Accordingly, a difference between the way a displayed image is seen at a region overlapping the detection electrode TDL and the way the display image is seen at the space SP is suppressed.

The first dummy wire 61 is provided with a slit 611, and the second dummy wire 62 is provided with a slit 621. A material forming the first dummy wire 61 and the second dummy wire 62 is not present or is removed by etching or the like at the slit 611 and the slit 621. The dummy electrode TDD is insulated from the detection electrode TDL by the slit 611 and the slit 621.

As illustrated in FIG. 14, the first dummy wire 61 includes a first dummy wide portion 61a, two first dummy narrow portions 61b, and first dummy inclined portions 61c. The first dummy wide portion 61a is disposed halfway between two adjacent connection portions 65, for example. The width of the first dummy wide portion 61a is gradually reduced as it gets closer to the connection portion 65. The edge of the first dummy wide portion 61a is straight. A width W5, which is the maximum width of the first dummy wide portion 61a, is about 4 μm, for example. The first dummy narrow portion 61b is disposed closer to the connection portion 65 than the first dummy wide portion 61a is. Specifically, the first dummy narrow portion 61b is disposed near the connection portion 65. The width of the first dummy narrow portion 61b is gradually reduced as it gets closer to the connection portion 65. The edge of the first dummy narrow portion 61b is straight. A width W6, which is the minimum width of the first dummy narrow portion 61b, is about 2 μm, for example. The width of the first dummy narrow portion 61b is smaller than the width of the first dummy wide portion 61a. The first dummy inclined portion 61c is disposed between the first dummy wide portion 61a and the first dummy narrow portion 61b. The first dummy inclined portion 61c joins the first dummy wide portion 61a and the first dummy narrow portion 61b. The width of the first dummy inclined portion 61c is gradually reduced from the first dummy wide portion 61a toward the first dummy narrow portion 61b. The edge of the first dummy inclined portion 61c is straight. In other words, the width of the first dummy wire 61 is gradually reduced from a midpoint of a line segment joining two adjacent connection portions 65 toward the connection portions 65. The edge of the first dummy wire 61 is straight. The width W5 and the width W6 do not have to be the sizes described above. It is sufficient as long as the width W5 is at least greater than the width W6.

As illustrated in FIG. 14, the second dummy wire 62 includes a second dummy wide portion 62a, two second dummy narrow portions 62b, and second dummy inclined portions 62c. The second dummy wide portion 62a is disposed halfway between two adjacent connection portions 65, for example. The width of the second dummy wide portion 62a is gradually reduced as it gets closer to the connection portion 65. The edge of the second dummy wide portion 62a is straight. A width W7, which is the maximum value of the second dummy wide portion 62a, is about 4 µm, for example. The second dummy narrow portion 62b is disposed closer to the connection portion 65 than the second dummy wide portion 62a is. Specifically, the second dummy narrow portion 62b is disposed near the connection portion 65. The width of the second dummy narrow portion 62b is gradually reduced as it gets closer to the connection portion 65. The edge of the second dummy narrow portion 62b is straight. A width W8, which is the minimum width of the second dummy narrow portion 62b, is about 2 µm, for example. The width of the second dummy narrow portion 62b is smaller than the width of the second dummy wide portion 62a. The second dummy inclined portion 62c is disposed between the second dummy wide portion 62a and the second dummy narrow portion 62b. The second dummy inclined portion 62c joins the second dummy wide portion 62a and the second dummy narrow portion 62b. The width of the second dummy inclined portion 62c is gradually reduced from the second dummy wide portion 62a toward the second dummy narrow portion 62b. The edge of the second dummy inclined portion 62c is straight. In other words, the width of the second dummy wire 62 is gradually reduced from a midpoint of a line segment joining two adjacent connection portions 65 toward the connection portions 65. The edge of the second dummy wire 62 is straight. The width W7 and the width W8 do not have to be the sizes described above. It is sufficient as long as the width W7 is at least greater than the width W8.

Because the first dummy wire 61 includes the first dummy narrow portions 61b, and the second dummy wire 62 includes the second dummy narrow portions 62b, the wiring density at the surrounding region of the connection portion 65 tends to be low. The difference in the transmittance between the surrounding region of the connection portion 65 and a region other than the connection portion 65 is thereby reduced. Therefore, generation of a pattern due to regions of different transmittance being arranged next to one another is suppressed. Moreover, a moire pattern (interference fringes) which is caused when a regular arrangement of regions of different transmittance and a pixel arrangement are overlapped with a specific gap is suppressed. Accordingly, visibility of a displayed image is not easily obstructed.

If the first dummy wire 61 includes the first dummy wide portion 61a and the first dummy narrow portions 61b, the second dummy wire 62 does not necessarily have to include the second dummy wide portion 62a and the second dummy narrow portions 62b. Conversely, if the second dummy wire 62 includes the second dummy wide portion 62a and the second dummy narrow portions 62b, the first dummy wire 61 does not necessarily have to include the first dummy wide portion 61a and the first dummy narrow portions 61b. That is, it is sufficient as long as at least one of the first dummy wire 61 and the second dummy wire 62 includes a wide member (a wide portion) and a member with a width smaller than the width of the wide member (a narrow portion). The number of first dummy narrow portions 61b and the number of second dummy narrow portions 62b may be one instead of two. That is, the first dummy narrow portion 61b may be provided at only one end of the first dummy wire 61, and the second dummy narrow portion 62b may be provided at only one end of the second dummy wire 62.

Second Embodiment

FIG. 15 is an enlarged view of a connection portion of a detection electrode according to a second embodiment. As illustrated in FIG. 15, a detection electrode TDLA according to the second embodiment includes a connection portion 55A different from the connection portion 55 described above. The first conductive wires 51 and the second conductive wires 52 are formed by etching, for example. Accordingly, the edge of the connection portion 55A is round. In this case, a width W2A, which is the minimum width of the first narrow portion 51b, is the width at a boundary between a curve drawn by the edge of the connection portion 55A and a straight line drawn by the edge of the first narrow portion 51b. A width W4A, which is the minimum width of the second narrow portion 52b, is the width at a boundary between a curve drawn by the edge of the connection portion 55A and a straight line drawn by the edge of the second narrow portion 52b.

Third Embodiment

FIG. 16 is an enlarged view of a connection portion of a detection electrode according to a third embodiment. As illustrated in FIG. 16, a detection electrode TDLB according to the third embodiment includes first conductive wires 51B and second conductive wires 52B different from the first conductive wires 51 and the second conductive wires 52 described above.

As illustrated in FIG. 16, the first conductive wire 51B includes a first wide portion 51aB, two first narrow portion 51bB, and first inclined portions 51cB. The first wide portion 51aB is disposed halfway between two adjacent connection portions 55B, for example. The width of the first wide portion 51aB is constant and is a width W1B. The width W1B is about 4 µm, for example. The first narrow portion 51bB is disposed closer to the connection portion 55B than the first wide portion 51aB is. Specifically, the first narrow portion 51bB is disposed near the connection portion 55B. The width of the first narrow portion 51bB is gradually reduced as it gets closer to the connection portion 55B. The edge of the first narrow portion 51bB is straight. A width W2B, which is the minimum width of the first narrow portion 51bB, is about 2 µm, for example. The width of the first narrow portion 51bB is smaller than the width of the first wide portion 51aB. The first inclined portion 51cB is disposed between the first wide portion 51aB and the first narrow portion 51bB. The first inclined portion 51cB joins the first wide portion 51aB and the first narrow portion 51bB. The width of the first inclined portion 51cB is gradually reduced from the first wide portion 51aB toward the first narrow portion 51bB. The edge of the first inclined portion 51cB is straight. The width W1B and the width W2B do not have to be the sizes described above. It is sufficient as long as the width W1B is at least greater than the width W2B. The first conductive wire 51B can be said to include the first wide portion 51aB, and the first narrow portion 51bB, the width of which is gradually reduced toward the connection portion 55B and which is coupled to the first wide portion 51aB, without including the first inclined portion 51cB. Alternatively, the first conductive wire 51B can be said to include the first wide portion 51aB, and the first inclined portion 51cB, the width of which is gradually reduced toward the connection portion 55B and which is coupled to the first wide portion 51aB, without including the first narrow portion 51bB.

As illustrated in FIG. 16, the second conductive wire 52B includes a second wide portion 52aB, two second narrow portions 52bB, and second inclined portions 52cB. The second wide portion 52aB is disposed halfway between two adjacent connection portions 55B, for example. The width of the second wide portion 52aB is constant and is a width W3B. The width W3B is about 4 μm, for example. The second narrow portion 52bB is disposed closer to the connection portion 55B than the second wide portion 52aB is. Specifically, the second narrow portion 52bB is disposed near the connection portion 55B. The width of the second narrow portion 52bB is gradually reduced as it gets closer to the connection portion 55B. The edge of the second narrow portion 52bB is straight. A width W4B, which is the minimum width of the second narrow portion 52bB, is about 2 μm, for example. The width of the second narrow portion 52bB is smaller than the width of the second wide portion 52aB. The second inclined portion 52cB is disposed between the second wide portion 52aB and the second narrow portion 52bB. The second inclined portion 52cB joins the second wide portion 52aB and the second narrow portion 52bB. The width of the second inclined portion 52cB is gradually reduced from the second wide portion 52aB toward the second narrow portion 52bB. The edge of the second inclined portion 52cB is straight. The width W3B and the width W4B do not have to be the sizes described above. It is sufficient as long as the width W3B is at least greater than the width W4B. The second conductive wire 52B can be said to include the second wide portion 52aB, and the second narrow portion 52bB, the width of which is gradually reduced toward the connection portion 55B and which is coupled to the second wide portion 52aB, without including the second inclined portion 52cB. Alternatively, the second conductive wire 52B can be said to include the second wide portion 52aB, and the second inclined portion 52cB, the width of which is gradually reduced toward the connection portion 55B and which is coupled to the second wide portion 52aB, without including the second narrow portion 52bB.

Fourth Embodiment

Figure 17:
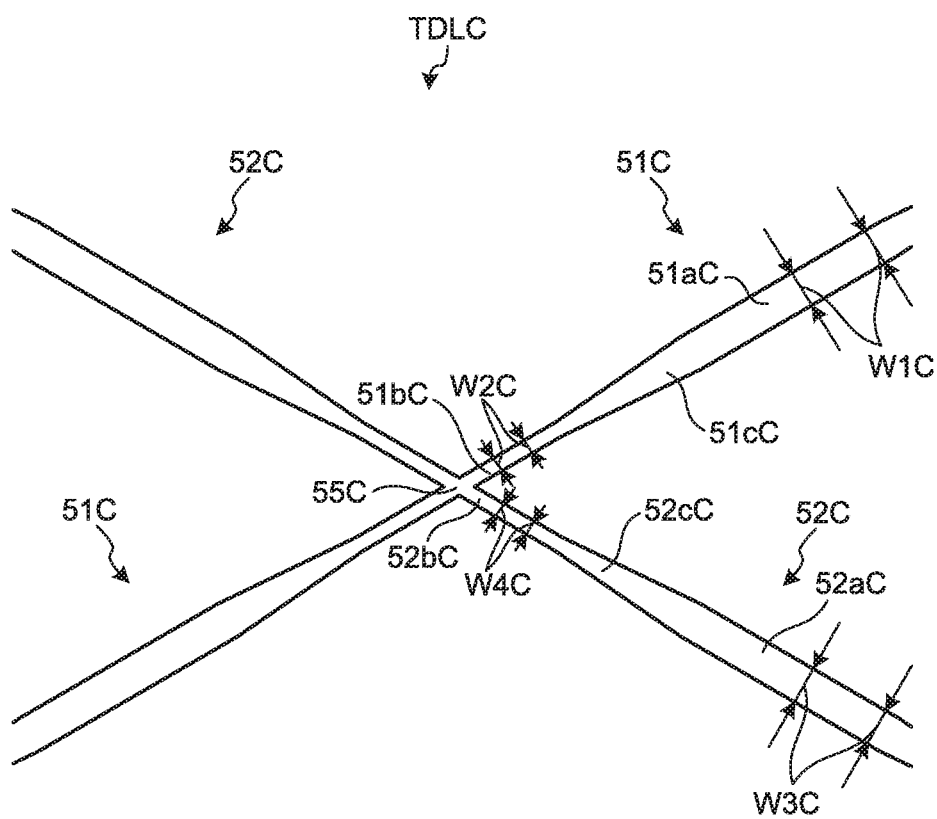
FIG. 17 is an enlarged view of a connection portion of a detection electrode according to a fourth embodiment.

FIG. 17 is an enlarged view of a connection portion of a detection electrode according to a fourth embodiment. As illustrated in FIG. 17, a detection electrode TDLC according to the fourth embodiment includes first conductive wires 51C and second conductive wires 52C different from the first conductive wires 51 and the second conductive wires 52 described above.

As illustrated in FIG. 17, the first conductive wire 51C includes a first wide portion 51aC, two first narrow portions 51bC, and first inclined portions 51cC. The first wide portion 51aC is disposed halfway between two adjacent connection portions 55C, for example. The width of the first wide portion 51aC is constant and is a width W1C. The width W1C is about 4 μm, for example. The first narrow portion 51bC is disposed closer to the connection portion 55C than the first wide portion 51aC is. Specifically, the first narrow portion 51bC is disposed near the connection portion 55C. The width of the first narrow portion 51bC is constant and is a width W2C. The width W2C is about 2 μm, for example. The width of the first narrow portion 51bC is smaller than the width of the first wide portion 51aC. The first inclined portion 51cC is disposed between the first wide portion 51aC and the first narrow portion 51bC. The first inclined portion 51cC joins the first wide portion 51aC and the first narrow portion 51bC. The width of the first inclined portion 51cC is gradually reduced from the first wide portion 51aC toward the first narrow portion 51bC. The edge of the first inclined portion 51cC is straight. The width W1C and the width W2C do not have to be the sizes described above. It is sufficient as long as the width W1C is at least greater than the width W2C.

As illustrated in FIG. 17, the second conductive wire 52C includes a second wide portion 52aC, two second narrow portions 52bC, and second inclined portions 52cC. The second wide portion 52aC is disposed halfway between two adjacent connection portions 55C, for example. The width of the second wide portion 52aC is constant and is a width W3C. The width W3C is about 4 μm, for example. The second narrow portion 52bC is disposed closer to the connection portion 55C than the second wide portion 52aC is. Specifically, the second narrow portion 52bC is disposed near the connection portion 55C. The width of the second narrow portion 52bC is constant and is a width W4C. The width W4C is about 2 μm, for example. The width of the second narrow portion 52bC is smaller than the width of the second wide portion 52aC. The second inclined portion 52cC is disposed between the second wide portion 52aC and the second narrow portion 52bC. The second inclined portion 52cC joins the second wide portion 52aC and the second narrow portion 52bC. The width of the second inclined portion 52cC is gradually reduced from the second wide portion 52aC toward the second narrow portion 52bC. The edge of the second inclined portion 52cC is straight. The width W3C and the width W4C do not have to be the sizes described above. It is sufficient as long as the width W3C is at least greater than the width W4C.

The first inclined portion 51cC may smoothly join the first wide portion 51aC with a constant width and the first narrow portion 51bC with a constant width. The second inclined portion 52cC may smoothly join the second wide portion 52aC with a constant width and the second narrow portion 52bC with a constant width.

Fifth Embodiment

FIG. 18 is an enlarged view of a connection portion of a detection electrode according to a fifth embodiment. As illustrated in FIG. 18, a detection electrode TDLD according to the fifth embodiment includes first conductive wires 51D and second conductive wires 52D different from the first conductive wires 51 and the second conductive wires 52 described above.

As illustrated in FIG. 18, the first conductive wire 51D includes a first wide portion 51aD, two first narrow portions 51bD, and first inclined portions 51cD. The first wide portion 51aD is disposed halfway between two adjacent connection portions 55D, for example. The width of the first wide portion 51aD is constant and is a width W1D. The width W1D is about 4 μm, for example. The first narrow portion 51bD is disposed closer to the connection portion 55D than the first wide portion 51aD is. Specifically, the first narrow portion 51bD is disposed near the connection portion 55D. The width of the first narrow portion 51bD is constant and is a width W2D. The width W2D is about 2 μm, for example. The width of the first narrow portion 51bD is smaller than the width of the first wide portion 51aD. The first inclined portion 51cD is disposed between the first wide portion 51aD and the first narrow portion 51bD. The first inclined portion 51cD joins the first wide portion 51aD and the first narrow portion 51bD. The width of the first inclined portion 51cD is gradually reduced from the first wide portion 51aD toward the first narrow portion 51bD. The edge of the first inclined portion 51cD is curved. More specifically, the edge of the first inclined portion 51cD is an arc passing through an end portion of the edge of the first wide portion 51aD and an end portion of the edge of the first narrow portion 51bD. The width W1D and the width W2D do not have to be the sizes described above. It is sufficient as long as the width W1D is at least greater than the width W2D.

As illustrated in FIG. 18, the second conductive wire 52D includes a second wide portion 52aD, two second narrow portions 52bD, and second inclined portions 52cD. The second wide portion 52aD is disposed halfway between two adjacent connection portions 55D, for example. The width of the second wide portion 52aD is constant and is a width W3D. The width W3D is about 4 μm, for example. The second narrow portion 52bD is disposed closer to the connection portion 55D than the second wide portion 52aD is. Specifically, the second narrow portion 52bD is disposed near the connection portion 55D. The width of the second narrow portion 52bD is constant and is a width W4D. The width W4D is about 2 μm, for example. The width of the second narrow portion 52bD is smaller than the width of the second wide portion 52aD. The second inclined portion 52cD is disposed between the second wide portion 52aD and the second narrow portion 52bD. The second inclined portion 52cD joins the second wide portion 52aD and the second narrow portion 52bD. The width of the second inclined portion 52cD is gradually reduced from the second wide portion 52aD toward the second narrow portion 52bD. The edge of the second inclined portion 52cD is curved. More specifically, the edge of the second inclined portion 52cD is an arc passing through an end portion of the edge of the second wide portion 52aD and an end portion of the edge of the second narrow portion 52bD. The width W3D and the width W4D do not have to be the sizes described above. It is sufficient as long as the width W3D is at least greater than the width W4D.

The first inclined portion 51cD may smoothly join the first wide portion 51aD with a constant width and the first narrow portion 51bD with a constant width. The second inclined portion 52cD may smoothly join the second wide portion 52aD with a constant width and the second narrow portion 52bD with a constant width.

Sixth Embodiment

FIG. 19 is an enlarged view of a connection portion of a detection electrode according to a sixth embodiment. As illustrated in FIG. 19, a detection electrode TDLE according to the sixth embodiment includes first conductive wires ME and second conductive wires 52E different from the first conductive wires 51 and the second conductive wires 52 described above.

As illustrated in FIG. 19, the first conductive wire ME includes a first wide portion 51aE, and two first narrow portions 51bE. The first wide portion 51aE is disposed halfway between two adjacent connection portions 55E, for example. The width of the first wide portion 51aE is constant and is a width W1E. The width W1E is about 4 μm, for example. The first narrow portion 51bE is disposed closer to the connection portion 55E than the first wide portion 51aE is. Specifically, the first narrow portion 51bE is disposed near the connection portion 55E. The width of the first narrow portion 51bE is constant and is a width W2E. The width W2E is about 2 μm, for example. The width of the first narrow portion 51bE is smaller than the width of the first wide portion 51aE. The first narrow portion 51bE is joined to the first wide portion 51aE. A step is formed between the first wide portion 51aE and the first narrow portion 51bE. The width W1E and the width W2E do not have to be the sizes described above. It is sufficient as long as the width W1E is at least greater than the width W2E.

As illustrated in FIG. 19, the second conductive wire 52E includes a second wide portion 52aE, and two second narrow portions 52bE. The second wide portion 52aE is disposed halfway between two adjacent connection portions 55E, for example. The width of the second wide portion 52aE is constant and is a width W3E. The width W3E is about 4 μm, for example. The second narrow portion 52bE is disposed closer to the connection portion 55E than the second wide portion 52aE is. Specifically, the second narrow portion 52bE is disposed near the connection portion 55E. The width of the second narrow portion 52bE is constant and is a width W4E. The width W4E is about 2 μm, for example. The width of the second narrow portion 52bE is smaller than the width of the second wide portion 52aE. The second narrow portion 52bE is joined to the second wide portion 52aE. A step is formed between the second wide portion 52aE and the second narrow portion 52bE. The width W3E and the width W4E do not have to be the sizes described above. It is sufficient if the width W3E is greater than the width W4E.

Seventh Embodiment

Figure 20:
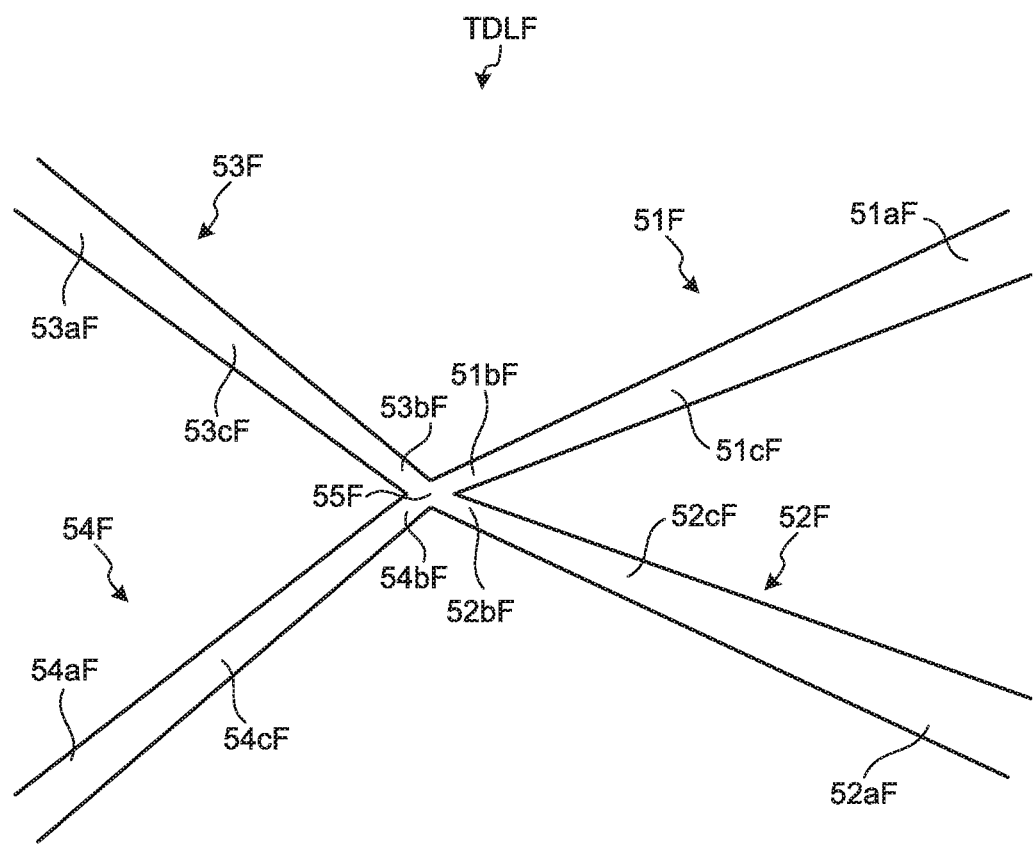
FIG. 20 is an enlarged view of a connection portion of a detection electrode according to a seventh embodiment.

FIG. 20 is an enlarged view of a connection portion of a detection electrode according to a seventh embodiment. As illustrated in FIG. 20, a detection electrode TDLF according to the seventh embodiment includes a plurality of conductive wires which are along mutually different directions. That is, the angles formed by the conductive wires with respect to the second pixel direction Dy are not constant (i.e., the angles are random). For example, a first conductive wire 51F, a second conductive wire 52F, a third conductive wire 53F, and a fourth conductive wire 54F intersect with one another at one connection portion 55F. The first conductive wire 51F, the second conductive wire 52F, the third conductive wire 53F, and the fourth conductive wire 54F form different angles with respect to the second pixel direction Dy.

As in the first embodiment described above, the first conductive wire 51F includes a first wide portion 51aF, two first narrow portions 51bF, and first inclined portions 51cF. The second conductive wire 52F includes a second wide portion 52aF, two second narrow portion 52bF, and second inclined portions 52cF. The third conductive wire 53F includes a third wide portion 53aF, two third narrow portions 53bF, and third inclined portions 53cF. The fourth conductive wire 54F includes a fourth wide portion 54aF, two fourth narrow portions 54bF, and fourth inclined portions 54cF.

Eighth Embodiment

FIG. 21 is a plan view illustrating a detection electrode according to an eighth embodiment. As illustrated in FIG. 21, a detection electrode TDLG according to the eighth embodiment forms a zigzag pattern. That is, the number of second conductive wires 52 in contact with one first conductive wire 51 at one connection portion 55G is one.

Even though the detection electrode TDLG is zigzag-shaped, the transmittance at the connection portion 55G is easily reduced. Because the first conductive wire 51 includes the first narrow portion 51b, and the second conductive wire 52 includes the second narrow portion 52b, the wiring density at a surrounding region of the connection portion 55G tends to be low. Accordingly, the difference in the transmittance between the surrounding region of the connection portion 55G and a region other than the connection portion 55G is reduced.

The edge of the connection portion 55G may be round as in the second embodiment. The shapes described in the third to the sixth embodiments may be applied as the shapes of the first conductive wire 51 and the second conductive wire 52. As in the seventh embodiment, the angles formed by the first conductive wires 51 and the second conductive wires 52 with respect to the second pixel direction Dy do not have to be constant (i.e., the angles may be random).

Ninth Embodiment

Figure 22:
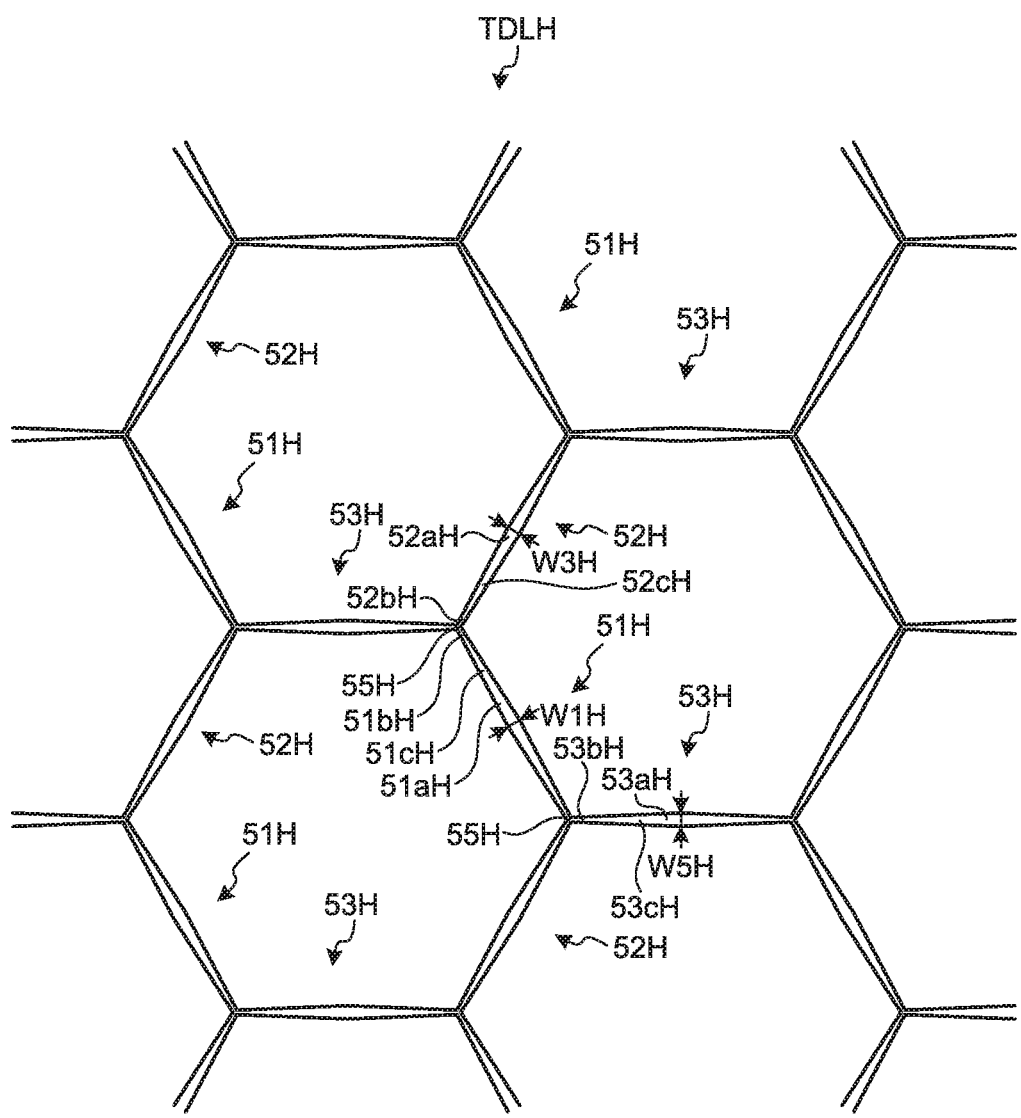
FIG. 22 is a plan view illustrating a detection electrode according to a ninth embodiment.
Figure 23:
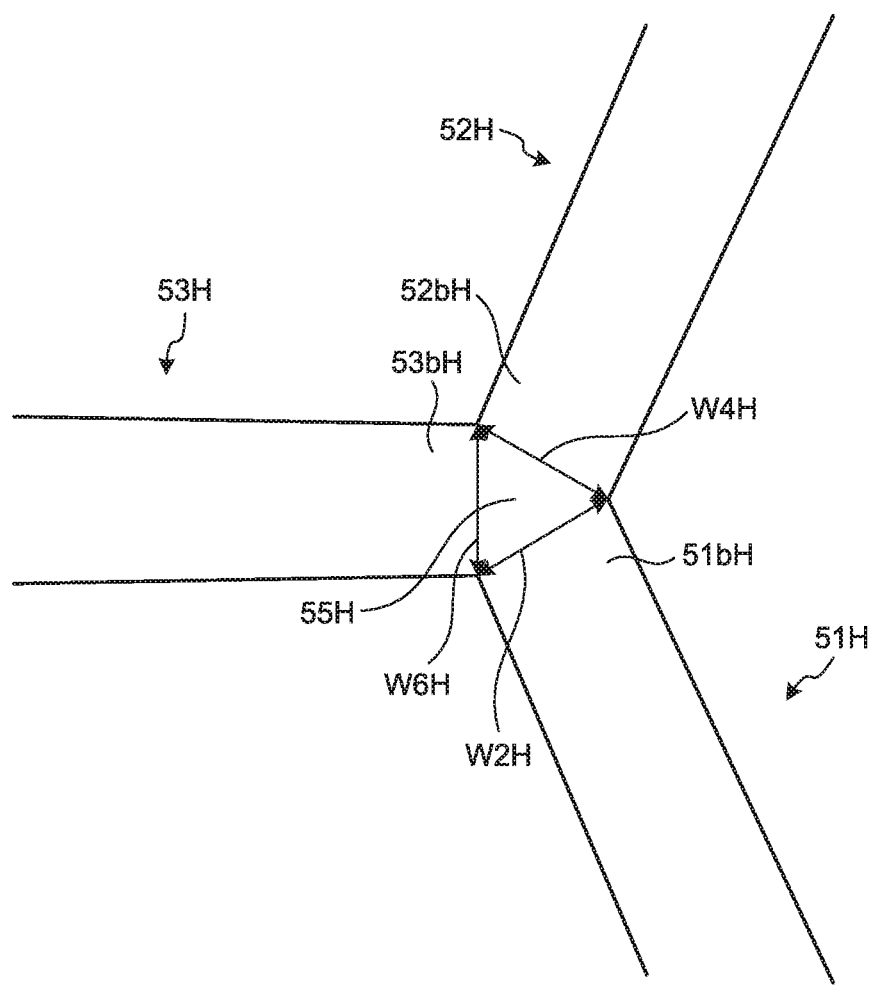
FIG. 23 is an enlarged view of a connection portion of the detection electrode according to the ninth embodiment.

FIG. 22 is a plan view illustrating a detection electrode according to a ninth embodiment. FIG. 23 is an enlarged view of a connection portion of the detection electrode according to the ninth embodiment. As illustrated in FIG. 22, a detection electrode TDLH according to the ninth embodiment forms a honeycomb lattice pattern. The detection electrode TDLH includes first conductive wires 51H, second conductive wires 52H, and third conductive wires 53H. The number of second conductive wires 52H in contact with one first conductive wire 51H at one connection portion 55H is one, and the number of third conductive wires 53H in contact with one first conductive wire 51H at one connection portion 55H is one.

The first conductive wires 51H are along a first direction Dm forming an angle θm with the first pixel direction Dx. The second conductive wires 52H are along a second direction Dn forming an angle θn with the first pixel direction Dx. The third conductive wires 53H are along the first pixel direction Dx. For example, the size of the angle θm is the same as the size of the angle θn, and is 60 degrees. That is, a regular hexagon is formed by two first conductive wires 51H, two second conductive wires 52H, and two third conductive wires 53H.

As illustrated in FIG. 22, the first conductive wire 51H includes a first wide portion 51aH, two first narrow portions 51bH, and first inclined portions 51cH. The first wide portion 51aH is disposed halfway between two adjacent connection portions 55H, for example. The width of the first wide portion 51aH is gradually reduced as it gets closer to the connection portion 55H. The edge of the first wide portion 51aH is straight. A width W1H, which is the maximum width of the first wide portion 51aH, is about 4 μm, for example. The first narrow portion 51bH is disposed closer to the connection portion 55H than the first wide portion 51aH is. Specifically, the first narrow portion 51bH is disposed near the connection portion 55H. The width of the first narrow portion 51bH is gradually reduced as it gets closer to the connection portion 55H. The edge of the first narrow portion 51bH is straight. As illustrated in FIG. 23, a width W2H, which is the minimum width of the first narrow portion 51bH, is about 2 μm, for example. The width of the first narrow portion 51bH is smaller than the width of the first wide portion 51aH. The first inclined portion 51cH is disposed between the first wide portion 51aH and the first narrow portion 51bH. The first inclined portion 51cH joins the first wide portion 51aH and the first narrow portion 51bH. The width of the first inclined portion 51cH is gradually reduced from the first wide portion 51aH toward the first narrow portion 51bH. The edge of the first inclined portion 51cH is straight. The width W1H and the width W2H do not have to be the sizes described above. It is sufficient as long as the width W1H is at least greater than the width W2H.

As illustrated in FIG. 22, the second conductive wire 52H includes a second wide portion 52aH, two second narrow portions 52bH, and second inclined portions 52cH. The second wide portion 52aH is disposed halfway between two adjacent connection portions 55H, for example. The width of the second wide portion 52aH is gradually reduced as it gets closer to the connection portion 55H. The edge of the second wide portion 52aH is straight. A width W3H, which is the maximum width of the second wide portion 52aH, is about 4 μm, for example. The second narrow portion 52bH is disposed closer to the connection portion 55H than the second wide portion 52aH is. Specifically, the second narrow portion 52bH is disposed near the connection portion 55H. The width of the second narrow portion 52bH is gradually reduced as it gets closer to the connection portion 55H. The edge of the second narrow portion 52bH is straight. As illustrated in FIG. 23, a width W4H, which is the minimum width of the second narrow portion 52bH, is about 2 μm, for example. The width of the second narrow portion 52bH is smaller than the width of the second wide portion 52aH. The second inclined portion 52cH is disposed between the second wide portion 52aH and the second narrow portion 52bH. The second inclined portion 52cH joins the second wide portion 52aH and the second narrow portion 52bH. The width of the second inclined portion 52cH is gradually reduced from the second wide portion 52aH toward the second narrow portion 52bH. The edge of the second inclined portion 52cH is straight. The width W3H and the width W4H do not have to be the sizes described above. It is sufficient as long as the width W3H is at least greater than the width W4H.

As illustrated in FIG. 22, the third conductive wire 53H includes a third wide portion 53aH, two third narrow portions 53bH, and third inclined portions 53cH. The third wide portion 53aH is disposed halfway between two adjacent connection portions 55H, for example. The width of the third wide portion 53aH is gradually reduced as it gets closer to the connection portion 55H. The edge of the third wide portion 53aH is straight. A width W5H, which is the maximum width of the third wide portion 53aH, is about 4 μm, for example. The third narrow portion 53bH is disposed closer to the connection portion 55H than the third wide portion 53aH is. Specifically, the third narrow portion 53bH is disposed near the connection portion 55H. The width of the third narrow portion 53bH is gradually reduced as it gets closer to the connection portion 55H. The edge of the third narrow portion 53bH is straight. As illustrated in FIG. 23, a width W6H, which is the minimum width of the third narrow portion 53b, is about 2 µm, for example. The width of the third narrow portion 53bH is smaller than the width of the third wide portion 53aH. The third inclined portion 53cH is disposed between the third wide portion 53aH and the third narrow portion 53bH. The third inclined portion 53cH joins the third wide portion 53aH and the third narrow portion 53bH. The width of the third inclined portion 53cH is gradually reduced from the third wide portion 53aH toward the third narrow portion 53bH. The edge of the third inclined portion 53cH is straight. The width W5H and the width W6H do not have to be the sizes described above. It is sufficient as long as the width W5H is at least greater than the width W6H.

Even though the detection electrode TDLH forms a honeycomb lattice pattern, the transmittance at the connection portion 55H is easily reduced. Because the first conductive wire 51H includes the first narrow portion 51bH, the second conductive wire 52H includes the second narrow portion 52bH, and the third conductive wire 53H includes the third narrow portion 53bH, the wiring density at a surrounding region of the connection portion 55H tends to be low. Accordingly, the difference in the transmittance between the surrounding region of the connection portion 55H and a region other than the connection portion 55H is reduced.

The edge of the connection portion 55H may be round as in the second embodiment. The shapes described in the third to the sixth embodiments may be applied as the shapes of the first conductive wire 51H, the second conductive wire 52H, and the third conductive wire 53H. The angle θm and the angle θn do not necessarily have to be 60 degrees. The third conductive wires 53H may be along a direction forming an angle with the first pixel direction Dx. As in the seventh embodiment, the angles formed by the first conductive wires 51H, the second conductive wires 52H and the third conductive wires 53H with respect to the first pixel direction Dx do not have to be constant (i.e., the angles may be random).

Tenth Embodiment

Figure 24:
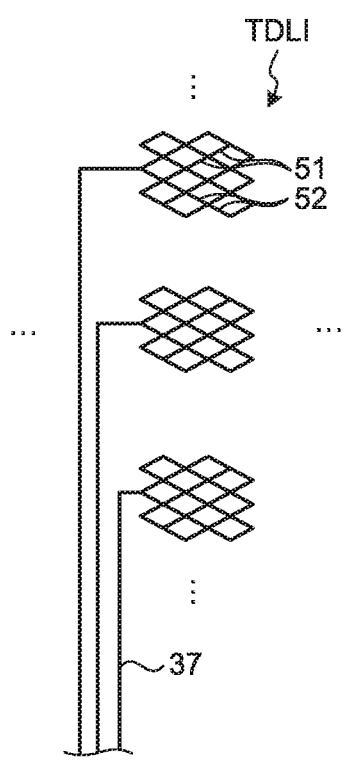
FIG. 24 is a plan view illustrating a detection electrode according to a tenth embodiment.

FIG. 24 is a plan view illustrating a detection electrode according to a tenth embodiment. As illustrated in FIG. 24, a detection electrode TDLI according to the tenth embodiment includes a plurality of detection blocks including a plurality of first conductive wires 51 and a plurality of second conductive wires 52. For example, the plurality of detection blocks are arranged in a matrix on a plane parallel to the substrate 31. The plurality of detection blocks are each coupled to the flexible printed circuit board 71 (see FIG. 8) by the wire 37. The touch panel 30 according to the tenth embodiment performs touch detection operation according to a self-capacitance method. Such touch detection operation according to a self-capacitance method may be applied to the first to the ninth embodiments described above.

Other effects and advantages, to be obtained by modes described by the embodiments and modifications, which are made apparent from the present specification or which are readily conceivable by those skilled in the art are interpreted as obtained by the present invention.

What is claimed is:

1. An input detection device comprising:
a substrate;
a plurality of detection electrodes disposed on a plane parallel to the substrate, each detection electrode including
a plurality of first conductive wires along a first direction,
a plurality of second conductive wires along a second direction different from the first direction, and
a plurality of opening portions disposed between the plurality of first conductive wires;
a display region overlapping the detection electrodes; and
a dummy electrode provided on a plane parallel to the substrate, the dummy electrode including a plurality of first dummy wires along the first direction,
wherein the display region includes a plurality of pixels in a matrix,
wherein each of the pixels includes a plurality of subpixels corresponding to color regions of mutually different colors,
wherein the subpixels of mutually different colors are arranged in a first pixel direction that is a direction forming an angle with the first direction,
wherein each of the first conductive wires includes
a first wide portion, and
a first narrow portion with a width smaller than a width of the first wide portion,
wherein each of the second conductive wires includes
a second wide portion, and
a second narrow portion with a width smaller than a width of the second wide portion, and
wherein each of the first dummy wire includes
a first dummy wide portion, and
a first dummy narrow portion with a width smaller than a width of the first dummy wide portion.

2. The input detection device according to claim 1, wherein each of the first conductive wire includes a first inclined portion joining the first wide portion and the first narrow portion, and
wherein a width of first inclined portion is gradually reduced from the first wide portion toward the first narrow portion.

3. The input detection device according to claim 2, wherein an edge of the first inclined portion is straight when seen from a direction perpendicular to the substrate.

4. The input detection device according to claim 2, wherein an edge of the first inclined portion is curved when seen from a direction perpendicular to the substrate.

5. The input detection device according to claim 1, wherein
a connection portion joins one of the first conductive wires and one of the second conductive wires, and
a width of the first narrow portion is gradually reduced toward the connection portion.

6. The input detection device according to claim 1, wherein each of the first conductive wire is a metal wire having a light shielding property.

* * * * *